(12) United States Patent
Labbe et al.

(10) Patent No.: US 11,767,083 B2
(45) Date of Patent: Sep. 26, 2023

(54) JERRY CAN ASSEMBLY AND BAG ASSEMBLY FOR A VEHICLE

(71) Applicant: BOMBARDIER RECREATIONAL PRODUCTS INC., Valcourt (CA)

(72) Inventors: Christian Labbe, Sherbrooke (CA); Francois Chenevert, Sherbrooke (CA); Mathieu Mercier, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 324 days.

(21) Appl. No.: 17/077,436

(22) Filed: Oct. 22, 2020

(65) Prior Publication Data

US 2021/0039749 A1 Feb. 11, 2021

Related U.S. Application Data

(62) Division of application No. 15/662,877, filed on Jul. 28, 2017, now Pat. No. 10,850,806, which is a
(Continued)

(51) Int. Cl.
*B62M 27/02* (2006.01)
*B60R 9/06* (2006.01)
*B60P 7/08* (2006.01)

(52) U.S. Cl.
CPC ........... *B62M 27/02* (2013.01); *B60P 7/0807* (2013.01); *B60R 9/06* (2013.01); *B62M 2027/028* (2013.01)

(58) Field of Classification Search
CPC ................ B60P 7/0807; B62M 27/02; B62M 2027/028; B60R 9/06
See application file for complete search history.

(56) References Cited

U.S. PATENT DOCUMENTS

| 3,625,405 A | 12/1971 | Kezar et al. |
| 3,779,597 A | 12/1973 | Ushida |
| (Continued) | | |

FOREIGN PATENT DOCUMENTS

| DE | 10392457 T5 | 3/2005 |
| EP | 2030879 B1 | 1/2010 |
| (Continued) | | |

OTHER PUBLICATIONS

Office Action issued from the USPTO dated Oct. 6, 2022 in connection with the related U.S. Appl. No. 17/718,003 and including PTO-892 Form.
(Continued)

*Primary Examiner* — Brian D Nash
(74) *Attorney, Agent, or Firm* — BCF LLP

(57) ABSTRACT

A jerry can assembly is configured to be selectively secured to a vehicle. The jerry can assembly includes a jerry can and a base connected to the jerry can. The jerry can includes a container body for containing fuel therein, the container body defining an opening for filling and emptying the container body; and a handle connected to the container body for carrying the jerry can. The base includes: a frame connected to the container body of the jerry can, the frame having a first end and a second end; a tongue disposed at the first end of the frame; and an anchor disposed at the second end of the frame, the anchor being configured to secure the jerry can assembly to the vehicle. A bag assembly is also contemplated.

28 Claims, 27 Drawing Sheets

Related U.S. Application Data division of application No. 14/389,476, filed as application No. PCT/US2013/034391 on Mar. 28, 2013, now Pat. No. 9,751,592.

(60) Provisional application No. 61/618,505, filed on Mar. 30, 2012.

(56) References Cited

U.S. PATENT DOCUMENTS

| | | | |
|---|---|---|---|
| 3,970,345 A | | 7/1976 | Holcomb |
| 4,059,207 A | | 11/1977 | Jackson et al. |
| 4,261,496 A | | 4/1981 | Mareydt et al. |
| 4,266,703 A | | 5/1981 | Litz |
| 4,274,568 A | | 6/1981 | Bott |
| 4,311,261 A | | 1/1982 | Anderson et al. |
| 4,516,709 A | | 5/1985 | Bott |
| 4,726,439 A | | 2/1988 | Iwao et al. |
| 5,025,883 A | | 6/1991 | Morinaka et al. |
| 5,123,795 A | | 6/1992 | Engel et al. |
| 5,251,345 A | * | 10/1993 | Pechner ............... A47K 3/286 4/603 |
| 5,273,330 A | | 12/1993 | Petry et al. |
| 5,558,260 A | | 9/1996 | Reichert |
| 5,725,138 A | | 3/1998 | Zagrodnik |
| 5,947,356 A | | 9/1999 | Delong |
| 6,257,261 B1 | | 7/2001 | Johnson |
| 6,299,042 B1 | * | 10/2001 | Smith ............... B62J 7/04 224/450 |
| 6,354,476 B1 | | 3/2002 | Alderman |
| 6,474,921 B1 | | 11/2002 | Gordon |
| 6,585,465 B1 | | 7/2003 | Hammond et al. |
| 6,623,071 B2 | | 9/2003 | Kawamoto et al. |
| 6,729,818 B1 | | 5/2004 | Yee et al. |
| 6,749,036 B1 | | 6/2004 | Schrapp et al. |
| 6,840,417 B2 | | 1/2005 | Heinrich et al. |
| 7,040,849 B2 | | 5/2006 | Cunningham et al. |
| 7,165,702 B1 | | 1/2007 | Billberg |
| 7,175,377 B2 | | 2/2007 | Womack et al. |
| 8,277,157 B2 | | 10/2012 | Parsons |
| 8,777,531 B2 | | 7/2014 | Massicotte et al. |
| 8,875,830 B2 | | 11/2014 | Massicotte et al. |
| 8,925,965 B2 | | 1/2015 | Pecora |
| 9,248,878 B2 | | 2/2016 | Lim |
| 9,302,851 B2 | | 4/2016 | Esser et al. |
| 9,409,509 B2 | | 8/2016 | Bohlke et al. |
| 9,499,088 B1 | | 11/2016 | Fenchak et al. |
| 10,227,110 B1 | | 3/2019 | Valence et al. |
| 2005/0006167 A1 | * | 1/2005 | Bertrand ............... B62K 19/46 180/290 |
| 2005/0036848 A1 | | 2/2005 | Cunningham et al. |
| 2005/0051575 A1 | * | 3/2005 | Durivage ............... B65D 71/02 222/143 |
| 2005/0092797 A1 | | 5/2005 | Takahashi et al. |
| 2005/0123379 A1 | | 6/2005 | Barina et al. |
| 2005/0150921 A1 | | 7/2005 | Schneider |
| 2005/0175426 A1 | | 8/2005 | Kroll et al. |
| 2006/0086552 A1 | * | 4/2006 | Vaisanen ............... B62J 1/12 180/190 |
| 2006/0138185 A1 | | 6/2006 | Lien et al. |
| 2006/0266777 A1 | | 11/2006 | Huang |
| 2008/0083801 A1 | | 4/2008 | Knoch et al. |
| 2008/0272165 A1 | | 11/2008 | McMillan |
| 2009/0152313 A1 | * | 6/2009 | Gandy ............... A45C 13/001 224/413 |
| 2010/0147916 A1 | | 6/2010 | Roberts et al. |
| 2013/0043289 A1 | | 2/2013 | Visenzi |
| 2013/0094920 A1 | | 4/2013 | Massicotte et al. |
| 2013/0133964 A1 | | 5/2013 | Massicotte et al. |
| 2014/0374564 A1 | | 12/2014 | Schroeder et al. |
| 2015/0089778 A1 | | 4/2015 | Tisol |
| 2015/0191210 A1 | | 7/2015 | Visenzi |
| 2015/0197301 A1 | | 7/2015 | Armstrong et al. |
| 2015/0210355 A1 | | 7/2015 | Labbe et al. |
| 2018/0051735 A1 | | 2/2018 | Stenyakin |
| 2022/0135145 A1 | | 5/2022 | Veillette et al. |

FOREIGN PATENT DOCUMENTS

| | | |
|---|---|---|
| RU | 2334615 C2 | 9/2008 |
| WO | 2012002959 A1 | 1/2012 |

OTHER PUBLICATIONS

The New 2013 Summit®: Making It Yours.' Youtube, [Online] Feb. 15, 2012, Retrieved from http://www.youtube.com/watch?v=IQr0dBtyBWU> on Aug. 13, 2013.

International Search Report of PCT/US2013/034391, Blaine R. Copenheaver, dated Aug. 26, 2013.

English translation of abstratct of DE1039245/15; retrieved from https://worldwide.espacenet.com/ on Apr. 12, 2017.

Decision for Granting a Patent issued by the Russian Patent Office in connection with Russian Application No. 2014141016 dated Feb. 8, 2017 and translation thereof.

Office Action issued from the Canadian Intellectual Property Office dated Mar. 25, 2019 in conection with the Canadian related application No. 3,006,919.

\* cited by examiner

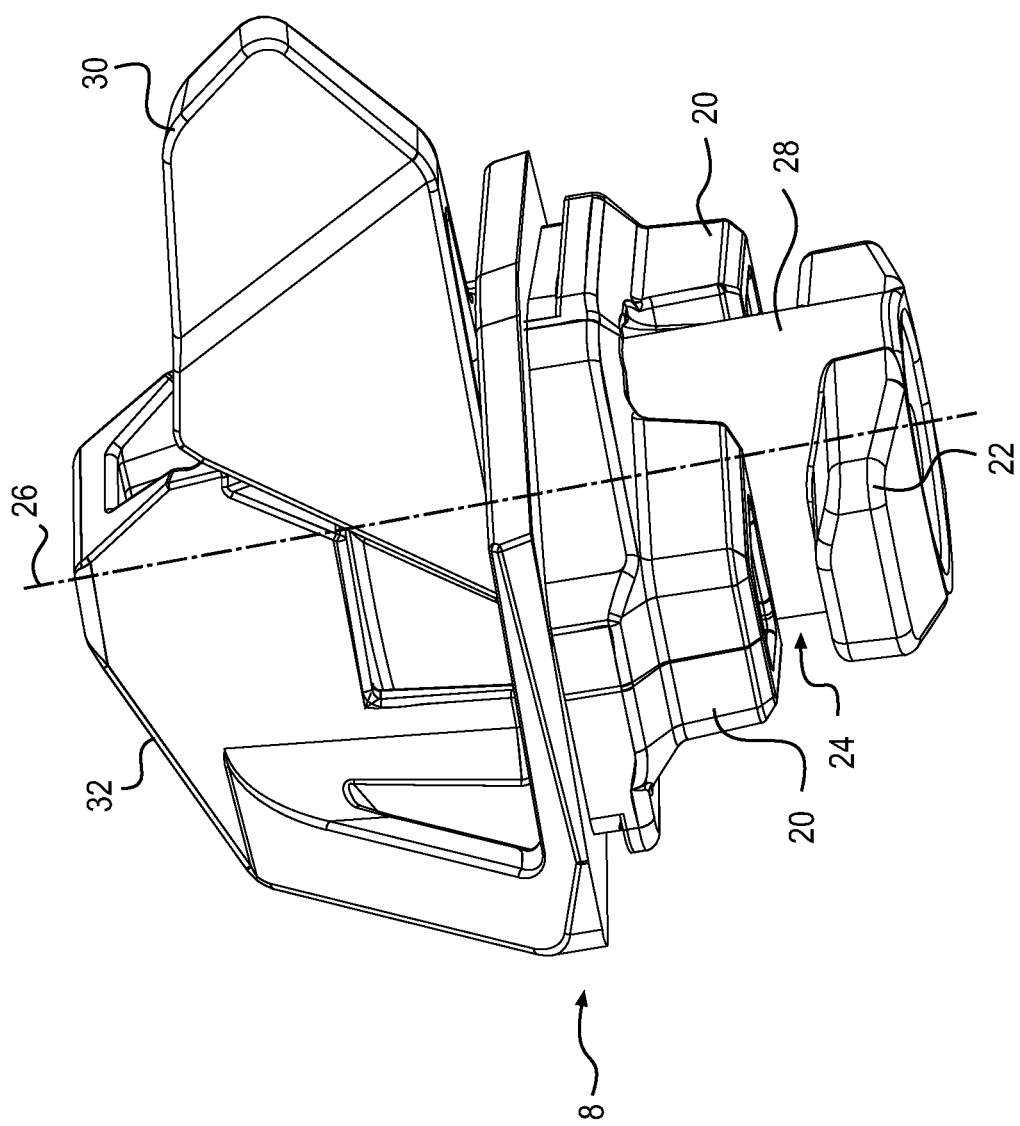

JERRY CAN ASSEMBLY AND BAG ASSEMBLY FOR A VEHICLE

CROSS-REFERENCE

The present application is a division of U.S. patent application Ser. No. 15/662,877, filed one Jul. 28, 2017, which is a division of U.S. patent application Ser. No. 14/389,476 (now issued as U.S. Pat. No. 9,751,592), filed on Sep. 30, 2014, which is a 371 of International Patent Application No. PCT/US2013/034391, filed on Mar. 28, 2013. International Patent Application No. PCT/US2013/034391 claims priority to U.S. Provisional Patent Application No. 61/618,505 filed on Mar. 30, 2012. The entirety of each of the above-listed applications is incorporated herein by reference.

FIELD OF THE INVENTION

The present invention relates to jerry cans and bags for vehicles.

BACKGROUND

Vehicles such as snowmobiles often carry jerry cans to contain fuel and bags to contain personal items and/or equipment in addition to passengers. The vehicles may be provided with sections or racks and the like to carry cargo. Other sections or arrangements may be also provided to add passengers. The cargo items are often secured to parts of the vehicles by ropes, cords, tie-downs and the like. This is however, not a convenient method for transporting objects on a vehicle. Jerks and bumps experienced during travel can sometimes result in objects shifting within the spaces in which they were placed, or loosening from the grips of the tying cords. It is not always easy to find a space having the ideal shape or size for carrying particular objects, or to find a hook or structure for securing an object to in the desired location.

Therefore, there is a need for a jerry can assembly and a bag assembly for vehicles that address at least in part the above drawbacks.

SUMMARY

It is an object of the present invention to ameliorate at least some of the inconveniences present in the prior art.

In one aspect, a jerry can assembly configured to be selectively secured to a vehicle is provided. The jerry can assembly includes a jerry can and a base connected to the jerry can. The jerry can includes: a container body for containing fuel therein, the container body defining an opening for filling and emptying the container body; and a handle connected to the container body for carrying the jerry can. The base includes: a frame connected to the container body of the jerry can, the frame having a first end and a second end; a tongue disposed at the first end of the frame; and an anchor disposed at the second end of the frame, the anchor being configured to secure the jerry can assembly to the vehicle.

In some embodiments, the container body has a first end portion and a second end portion; and the opening of the container body is disposed at the first end portion.

In some embodiments, the opening of the container body is disposed closer to the tongue than to the anchor.

In some embodiments, the base is removably connected to the jerry can.

In some embodiments, the frame is connected to a bottom surface of the container body.

In some embodiments, the tongue and the anchor are opposite one another in a first direction; and a dimension of the frame measured in a second direction perpendicular to the first direction is greater at a central portion of the frame between the tongue and the anchor than at the tongue and the anchor.

In some embodiments, the anchor includes an anchor base and an anchor lock extending downward from the anchor base, the anchor lock being adapted to selectively engage an anchor fixture of the vehicle to secure the jerry can assembly to the vehicle; and the tongue extends parallel to the anchor lock.

In some embodiments, the tongue and the anchor are opposite one another in a first direction; and a dimension of the container body measured in a second direction perpendicular to the first direction is greater than a dimension of the frame measured in the second direction.

In some embodiments, a dimension of the container body measured in the first direction is greater than a dimension of the frame measured in the first direction.

In some embodiments, the vehicle includes a first anchor fixture and a second anchor fixture; the tongue is configured to be inserted into the first anchor fixture; and the anchor is configured to be inserted into the second anchor fixture, the anchor being configured to be selectively retained by the second anchor fixture to secure the jerry can assembly to the vehicle.

In another aspect, a bag assembly configured to be selectively secured to a vehicle is provided. The bag assembly includes a bag and a base connected to the bag. The bag has a bag body. The base includes: a frame connected to the bag body, the frame having a first end and a second end; a tongue disposed at the first end of the frame; and an anchor disposed at the second end of the frame, the anchor being configured to secure the bag assembly to the vehicle.

In some embodiments, the base is removably connected to the bag.

In some embodiments, the tongue and the anchor are opposite one another in a first direction; and a dimension of the frame measured in a second direction perpendicular to the first direction is greater at a central portion of the frame between the tongue and the anchor than at the tongue and the anchor.

In some embodiments, the anchor comprises an anchor base and an anchor lock extending downward from the anchor base, the anchor lock being adapted to selectively engage an anchor fixture of the vehicle to secure the bag assembly to the vehicle; and the tongue extends parallel to the anchor lock.

In some embodiments, the frame is connected to a bottom surface of the bag body.

In some embodiments, the vehicle includes a first anchor fixture and a second anchor fixture; the tongue is configured to be inserted into the first anchor fixture; and the anchor is configured to be inserted into the second anchor fixture, the anchor being configured to be selectively retained by the second anchor fixture to secure the bag assembly to the vehicle.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle, in a straight ahead orientation (i.e. not steered left or right), and in an upright position. When referring to a component alone, terms related to spatial orientation should be taken with respect to the component itself. The explanations provided above regarding the above terms take precedence over explanations of these terms that may be found in any one of the documents incorporated herein by reference.

Embodiments of the present invention each have at least one of the above-mentioned objects and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 1C shows a perspective view taken from a bottom, right side of the anchor of FIG. 1B in isolation;

FIG. 2A shows a perspective view taken from a front, left side; FIG. 2B shows a perspective view taken from a rear, right side; FIG. 2C shows a front elevation view; FIG. 2D shows a top plan view; and FIG. 2E shows a rear elevation view of the anchor fixture of FIG. 1;

FIG. 9A is a perspective view taken from a rear, right side thereof; FIG. 9B is a left side elevation view thereof and FIG. 9C is a top plan view thereof;

FIG. 14A is a perspective view taken from a top, rear side thereof; FIG. 14B is a left side elevation view thereof; FIG. 14C is a top plan view thereof; FIG. 14D is a rear elevation view thereof; FIG. 14E is a front elevation view; and FIG. 14F is a right side elevation view of the fixture on the left side of the snowmobile of FIG. 11.

DETAILED DESCRIPTION

Figure 1A:
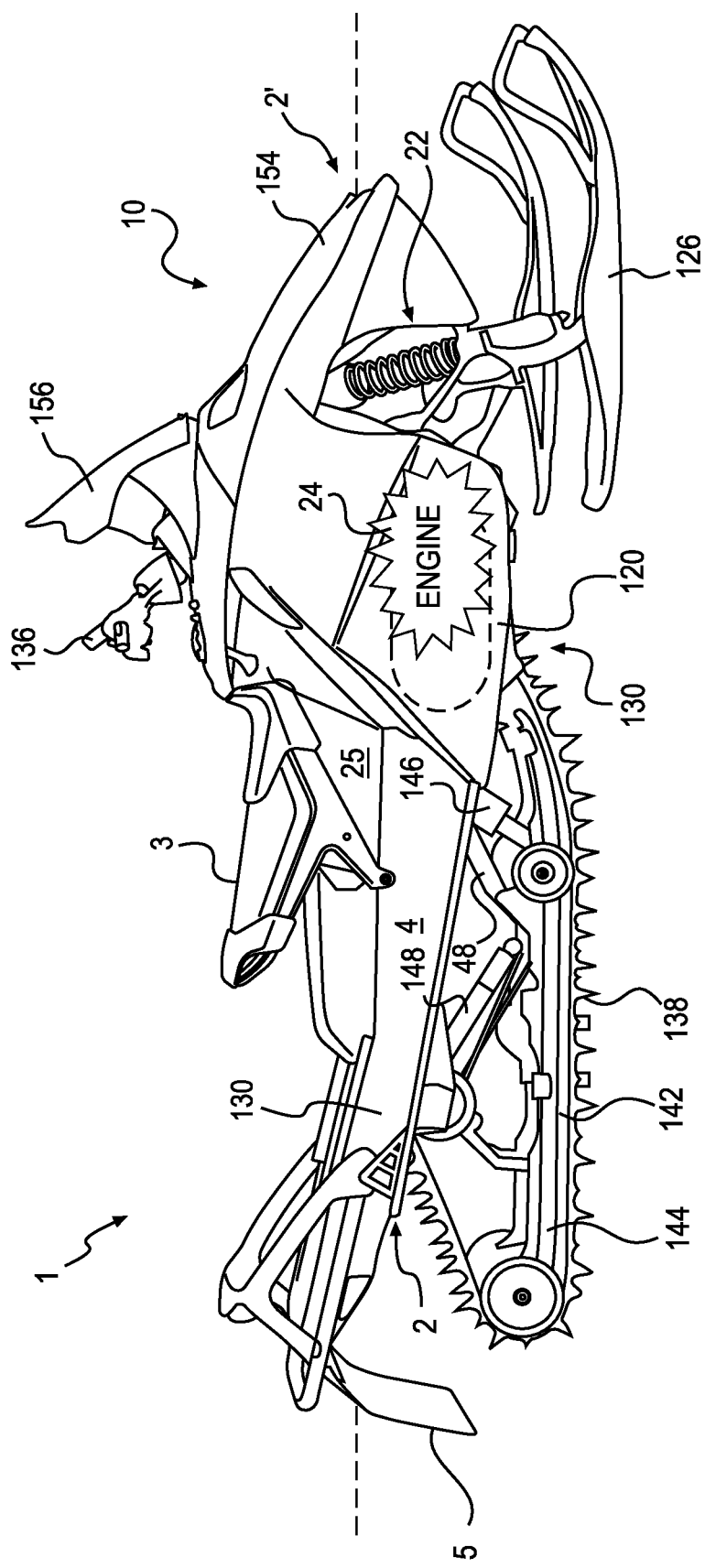
FIG. 1A is a right side elevation view of a snowmobile.

With reference to FIG. 1A, the middle and rear part of a snowmobile, shown generally as 1, will be described generally. It should be understood that the snowmobile 1 could be another type of snowmobile, and could have a construction other than the one described. The snowmobile 1 has a front end 2' and a rear end 2, which are defined with respect to the forward travel direction of the snowmobile 1.

The snowmobile 1 includes a chassis 130 which includes a tunnel 4. A ski 26 and steering assembly 136 is provided at the front end 2' of the snowmobile 1. The engine 124 and a belt transmission system 120 (shown schematically) disposed near the front end 3 are enclosed by fairings 154 which not only protect the engine 124 and the belt transmission system 120, but can also be decorated to make the snowmobile 1 more aesthetically pleasing.

In the rear section, an endless drive track 138 is disposed under the tunnel 4. The endless drive track 138 is operatively connected to the engine 124 through the belt transmission system 120. The endless drive track 138 is driven to run about a rear suspension assembly 148 for propulsion of the snowmobile 1. The endless drive track 138 is suspended for movement relative to the chassis 130, by a rear suspension assembly 148. The rear suspension assembly 148 includes a slide frame assembly 144 which primarily includes a pair of spaced apart slide rails 144 that engage the inner side of the ground-engaging portion of the endless drive track 138. A snowflap 5 is disposed at the rear end 2 of the snowmobile 1.

Figure 11A:
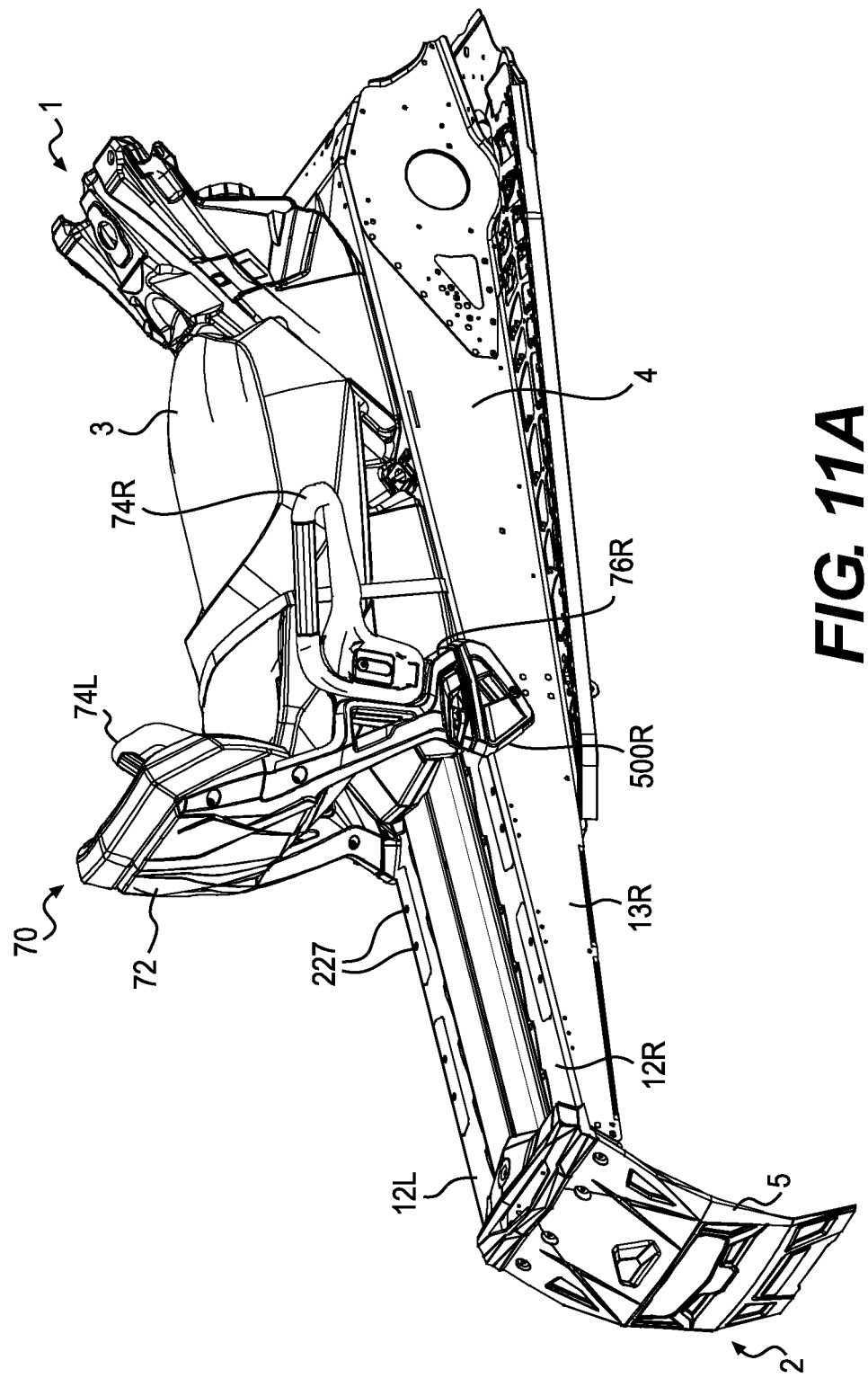
FIG. 11A is a perspective view taken from a rear, right side of portions of the snowmobile showing a backrest secured thereto by means of a fixture according to another embodiment.
Figure 11B:
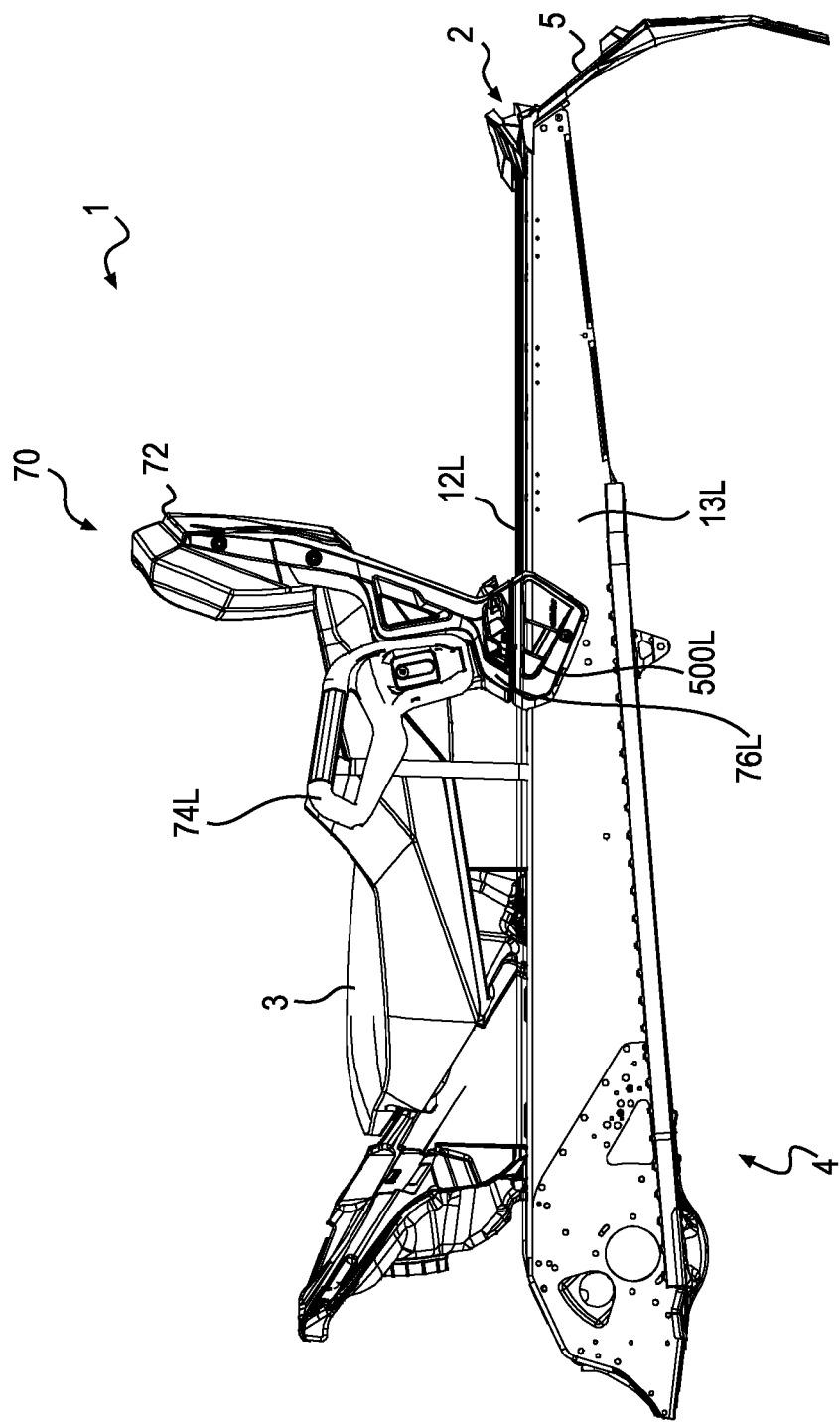
FIG. 11B is a left side elevation view of the snowmobile of FIG. 11A.
Figure 11C:
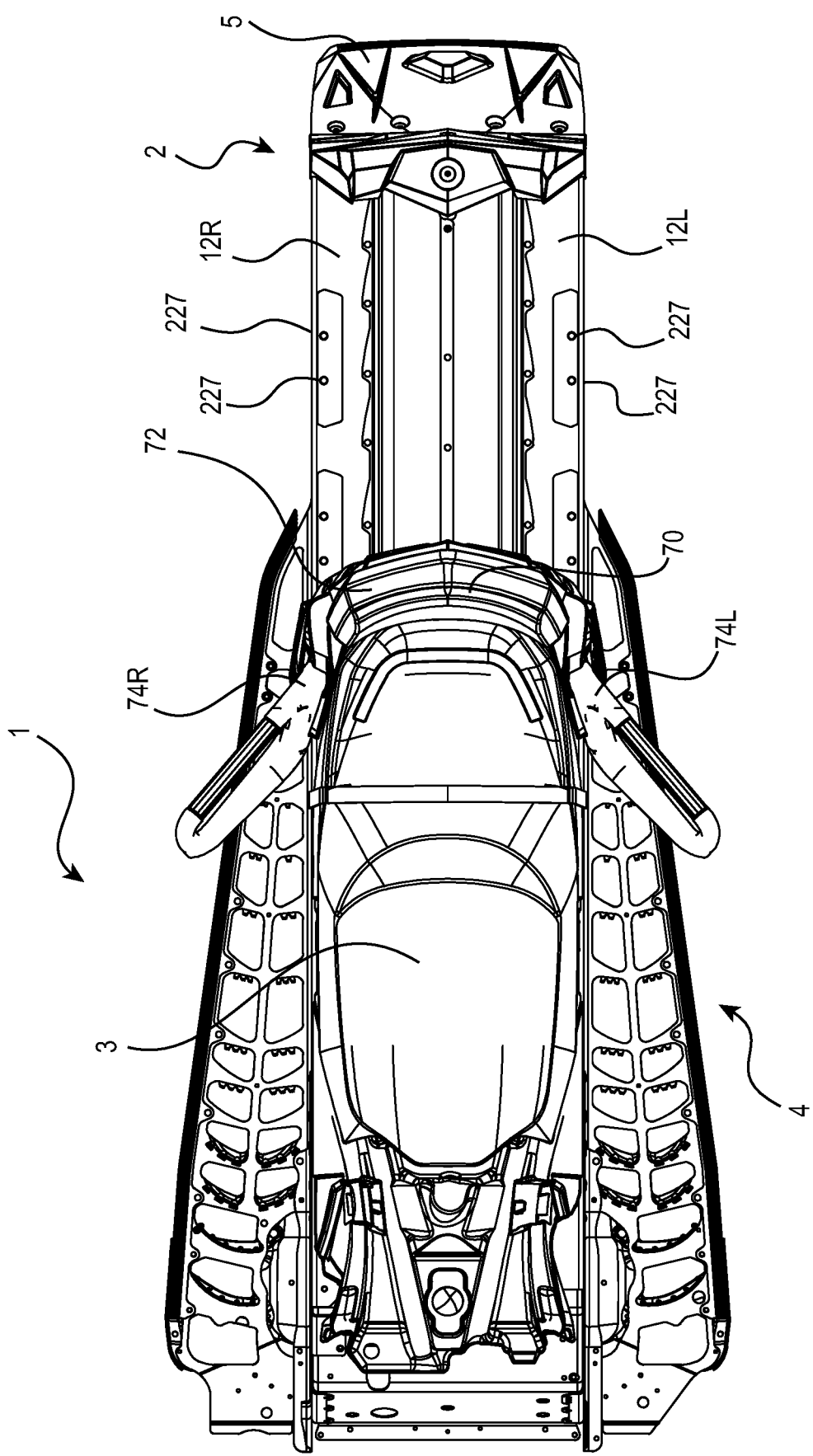
FIG. 11C is a top plan view of the snowmobile of FIG. 11A.
Figure 12:
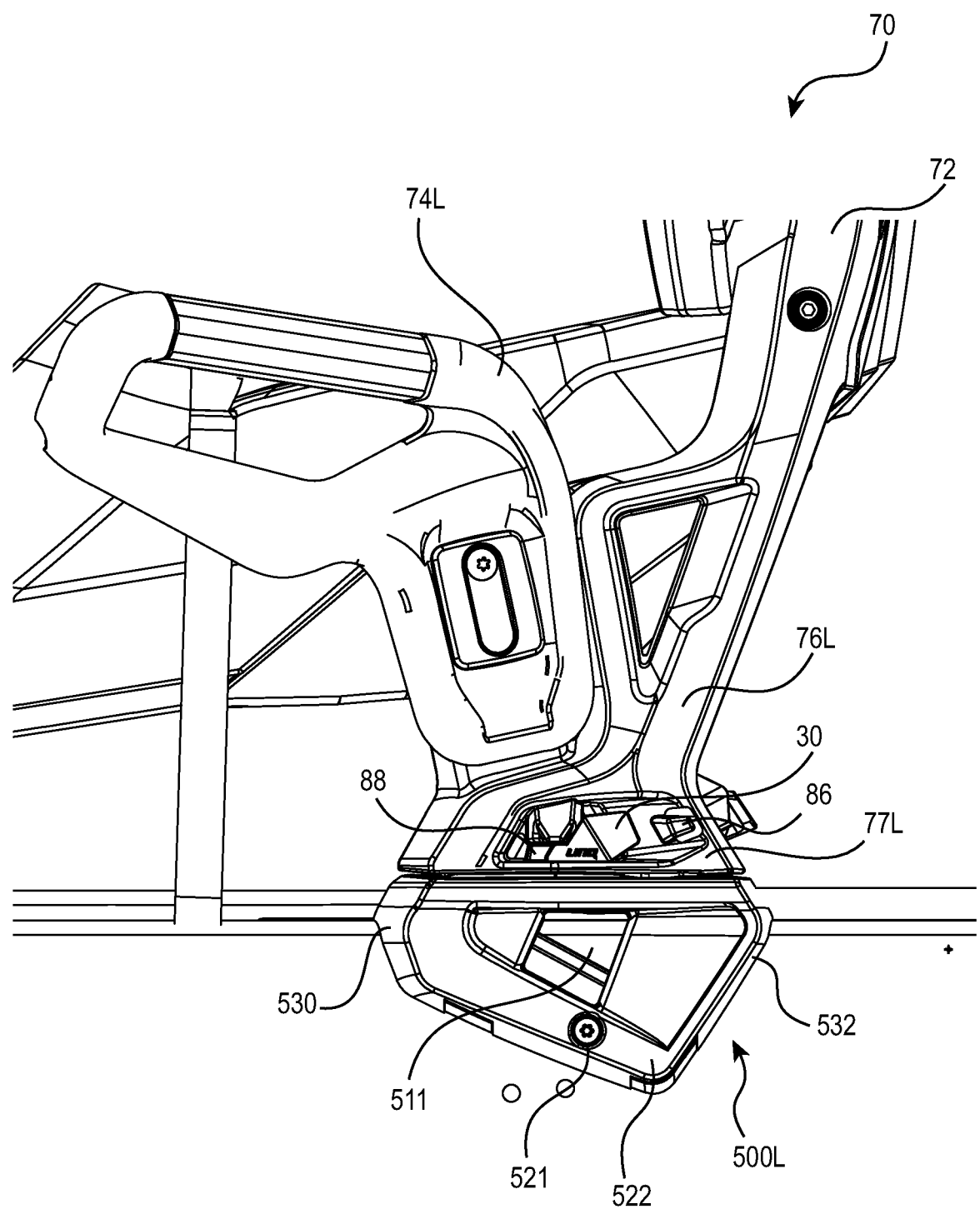
FIG. 12 is a close-up left side elevation view of the left armrest and the left fixture of FIG. 11A.

A snowmobile driver seat 3 is installed in the rear section of the snowmobile 1. A rear portion of the seat 3 may include a storage compartment, or may be used to accept a passenger seat 70 (FIG. 11A).

Figure 1B:
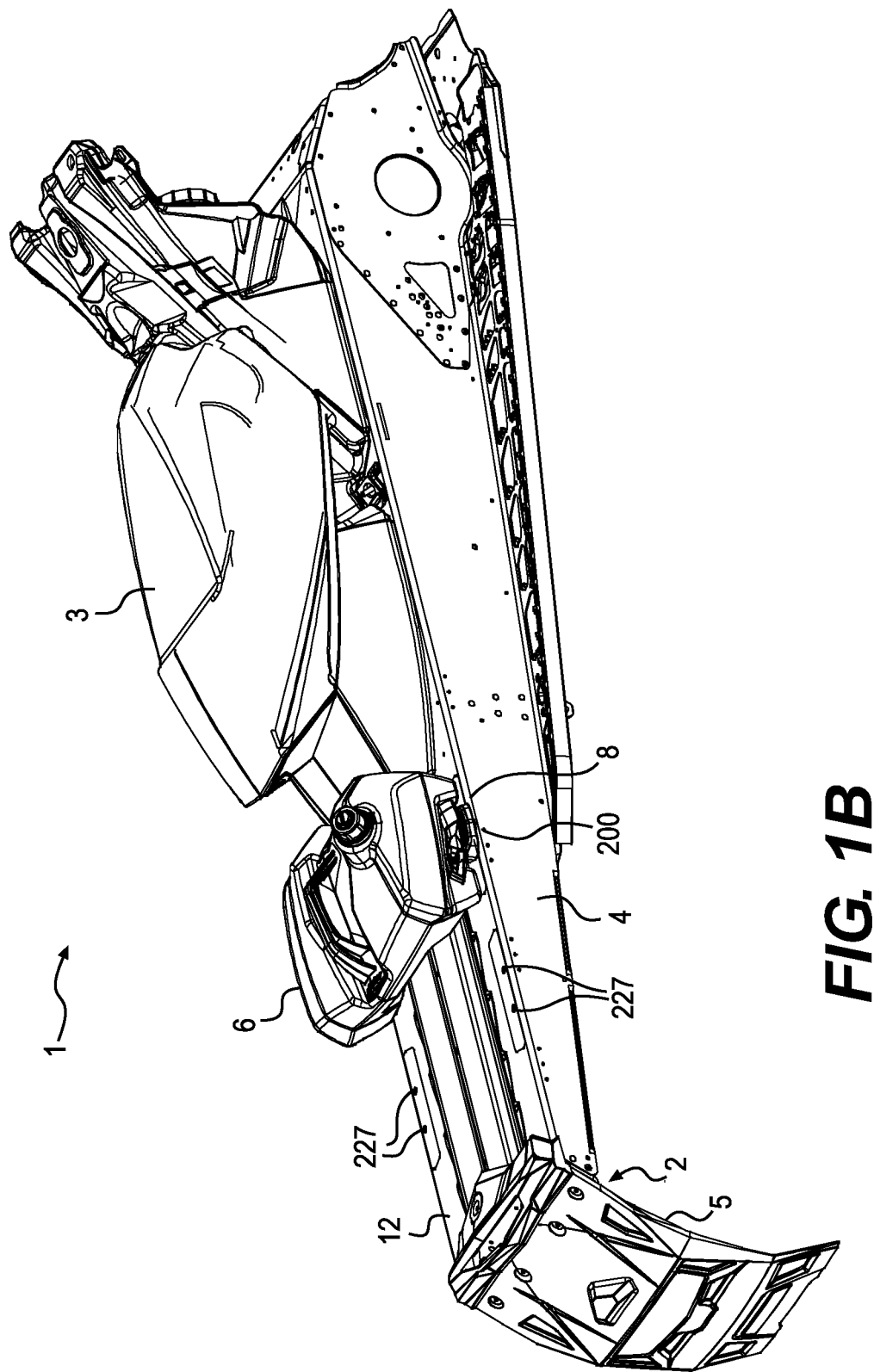
FIG. 1B is a perspective view taken from a rear, right side of portions of the snowmobile of FIG. 1 showing a jerry can secured to anchor fixtures on a tunnel of the snowmobile, one of the anchor fixtures having an anchor attached thereto.

With reference to FIG. 1B, an accessory 6 is anchored rearwards of the seat 3 on the upper surface 12 of the tunnel 4 by an anchor 8 secured to an anchor fixture 200 on the upper surface of the tunnel 4. The accessory 6 is a jerry can used for transporting fuel on longer excursions. The anchor 8 and the fixture 200 securing the accessory 6 to the snowmobile tunnel 4, and their operation will be discussed in greater detail below.

The snowmobile 1 has other features and components which would be readily recognized by one of ordinary skill in the art, further explanation and description of these components will not be provided herein.

Figure 2A:
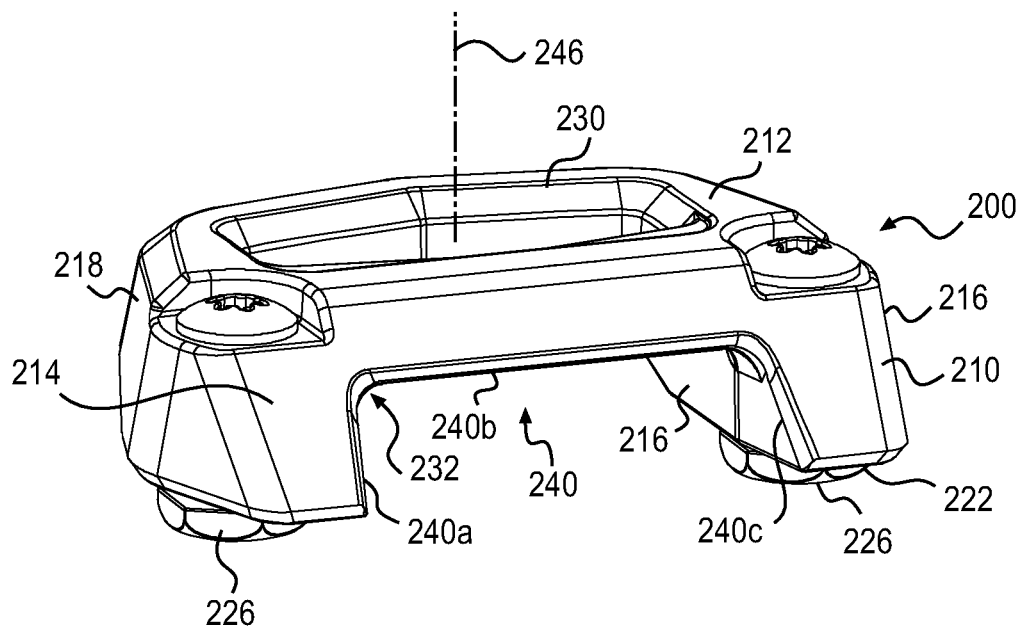
FIGS. 2A-2E are various close-up views of a right one of the anchor fixtures of FIG. 1B.
Figure 2B:
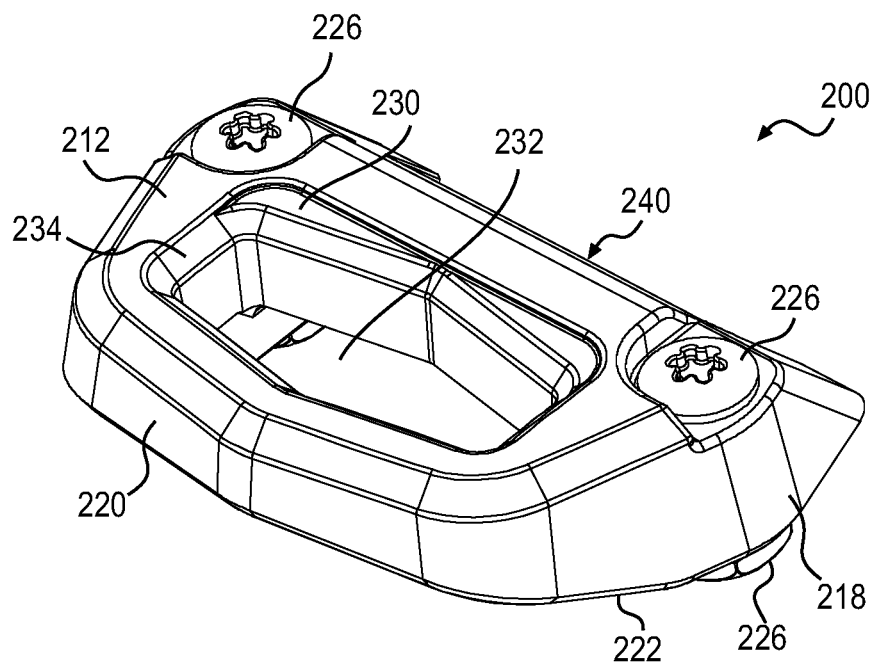
Figure 2C:
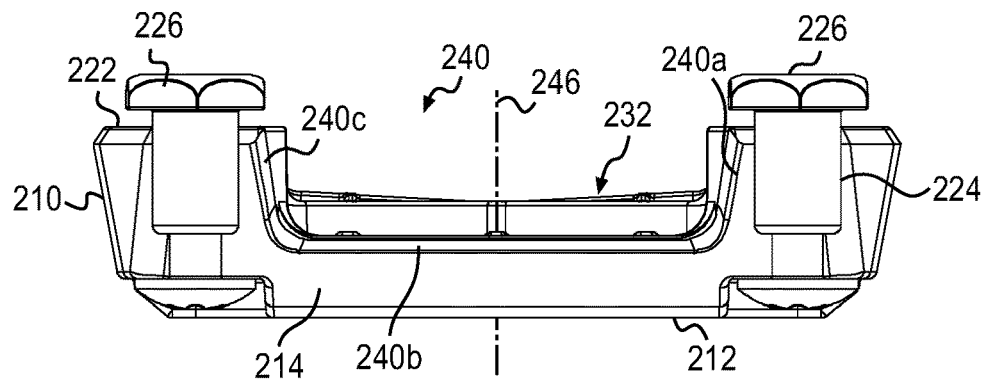
Figure 2D:
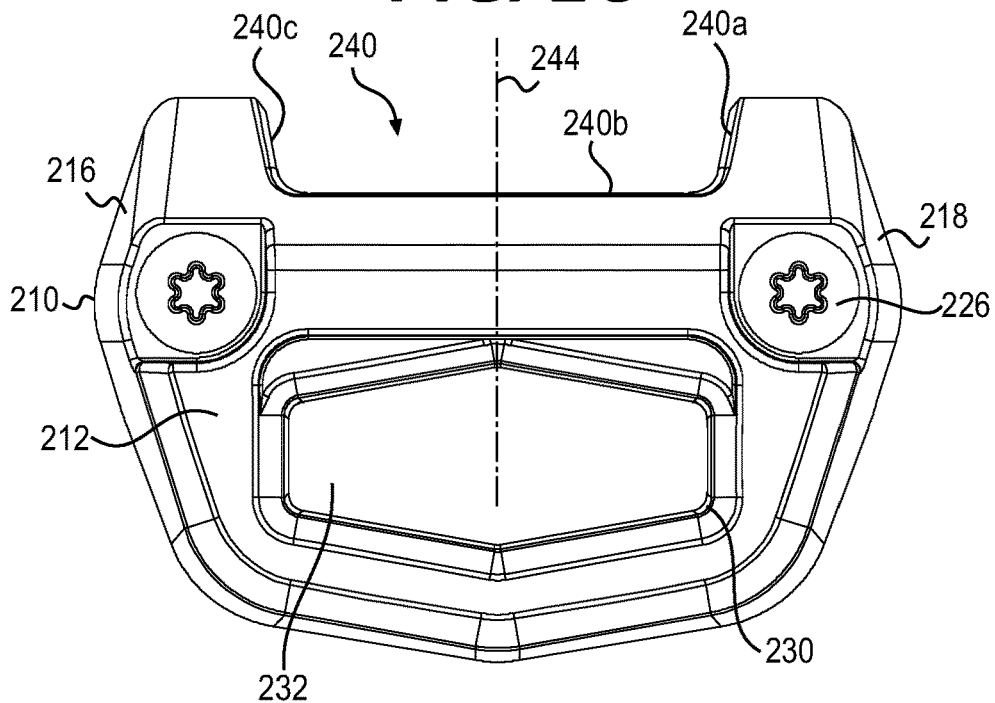
Figure 2E:
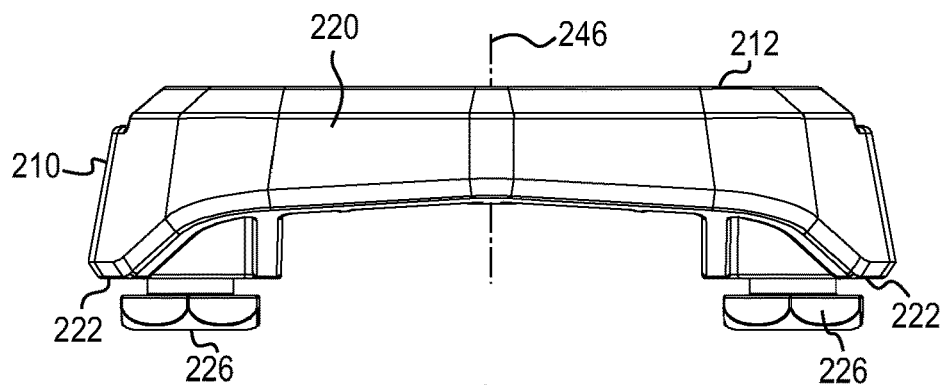

With reference to FIG. 1C, an exemplary anchor 8 includes an anchor base 20 and an anchor lock 22 extending from an anchor base 20. The anchor lock 22 and the anchor base 20 are separated by a space 24 wherein one or more surfaces can be held anchored together. The anchor base 20 and anchor lock 22 have an elongated shape. The anchor lock 22 is rotatable about an axis 26 perpendicular to the anchor base 20 between a locked position and an unlocked position that are separated by a quarter turn. In the unlocked position, the anchor lock 22 is disposed parallel to the anchor base 20, and in the locked position, the anchor lock 22 is disposed perpendicular to the anchor base 20. The anchor lock 22 extends from a stem 28 disposed along the axis 26. A lever 30 in the portion 32 of the anchor 8 that extends above the base 20 is rotatable about the axis 26 and is operatively connected to the anchor lock 22 to move the anchor lock 22 between the locked and unlocked positions. The locked and unlocked positions of the anchor 8 correspond to the anchor lock 22 being rotated by 90 degrees relative to the anchor base 20, and to the lever 30 being correspondingly turned by 90 degrees. It is contemplated that the anchor lock 22 could be turned by more or less than 90 degrees to engage an aperture 230 (FIG. 2A) in the fixture 200. It is also contemplated that the lever 30 could be turned by a different angle than the anchor base 20 in order to move the anchor 8 between locked and unlocked positions. International Patent Publication No. WO 2012/002959 A1, published on 5 Jan. 2012, the entirety of which is incorporated herein by reference, provides additional details regarding anchors similar in construction to the anchor 8, and will not be discussed here in more detail.

With reference to FIGS. 2A through 2E, an anchor fixture 200, has a fixture body 210 with top 212, front 214, left side 216, right side 218 and rear 220 portions, each portion having an interior and an exterior surface. The fixture body 210 also has a base 222. An anchor aperture 230, designed for an anchor 8 to be inserted into, is defined through the top portion 212 of the anchor fixture 200. The anchor aperture 230 leads downwards through the top portion 212 to an anchor chamber 232. The anchor chamber 232, below the anchor aperture 230, extends outwards towards the front surface 214. A fastener aperture 240, designed for the insertion of a tongue fastener 310 (FIG. 3) is defined in the front surface 214A pair of fasteners 226 inserted through a pair of fastener holes 224 in the fixture body 210 are used to secure the fixture 200 into fastener holes 227 defined in a vehicle surface.

The central axis 244 of the fastener aperture 240 (axis normal to the fastener aperture 240) is perpendicular to the central axis 246 of the anchor aperture 230 (axis perpendicular to the anchor aperture 230) and parallel to the base 222. The fastener aperture central axis 244 generally defines an acute angle with the anchor fixture base 222. It is contemplated that the central axes 244, 246 could be disposed at other angles to each other and to the anchor fixture base 222.

The elongated anchor lock 22 of an anchor 8 is inserted into the anchor chamber 232 through the anchor aperture 230 of top portion 212. The anchor lock 22 selectively engages the interior surface of the top portion 212 of the anchor chamber 232 when rotated between the unlocked position and the locked position. The anchor aperture 230 is elongated to allow insertion of the elongated anchor lock 22 into the anchor chamber 232, and the anchor chamber 232 extends outwards from the anchor aperture 230 to allow rotation of the elongated anchor lock 22 within the anchor chamber 232.

The anchor aperture 230 is in the shape of an irregular hexagon. The anchor aperture 230 is also contemplated to have other shapes such as circular, elliptical, polygonal and the like, depending on the anchor shape and anchor mechanism contemplated for use with the anchor fixture. For anchors 8 of the type shown in FIG. 1C, the anchor aperture 230 can be any elongated shape such as elliptical, rectangular or an irregular polygon. The anchor aperture 230 has a chamfered rim 234, however, it is contemplated that the rim 234 could be unchamfered.

The anchor chamber 232 leading from the anchor aperture 230 is bounded partly by the interior surfaces of the anchor fixture 210, however, it is contemplated that the anchor chamber 232 could have more or fewer boundary surfaces than as shown, in part based on the anchor shape and selective engagement mechanism. The fastener aperture 240 in the front surface is generally rectangular and defined by three edges 240a, 240b, 240c of the front surface 214 of the fixture body 210. The fourth edge of the fastener aperture 240 would be defined by the surface on which the anchor fixture is attached. It is contemplated that the fastener aperture can be defined wholly by the fixture body 210 or by the fixture body 210 and any other surfaces that the anchor fixture 200 may be engaged with. For example, the fixture body 210 could define a portion of one or two sides of the fastener aperture 240.

Figure 3:
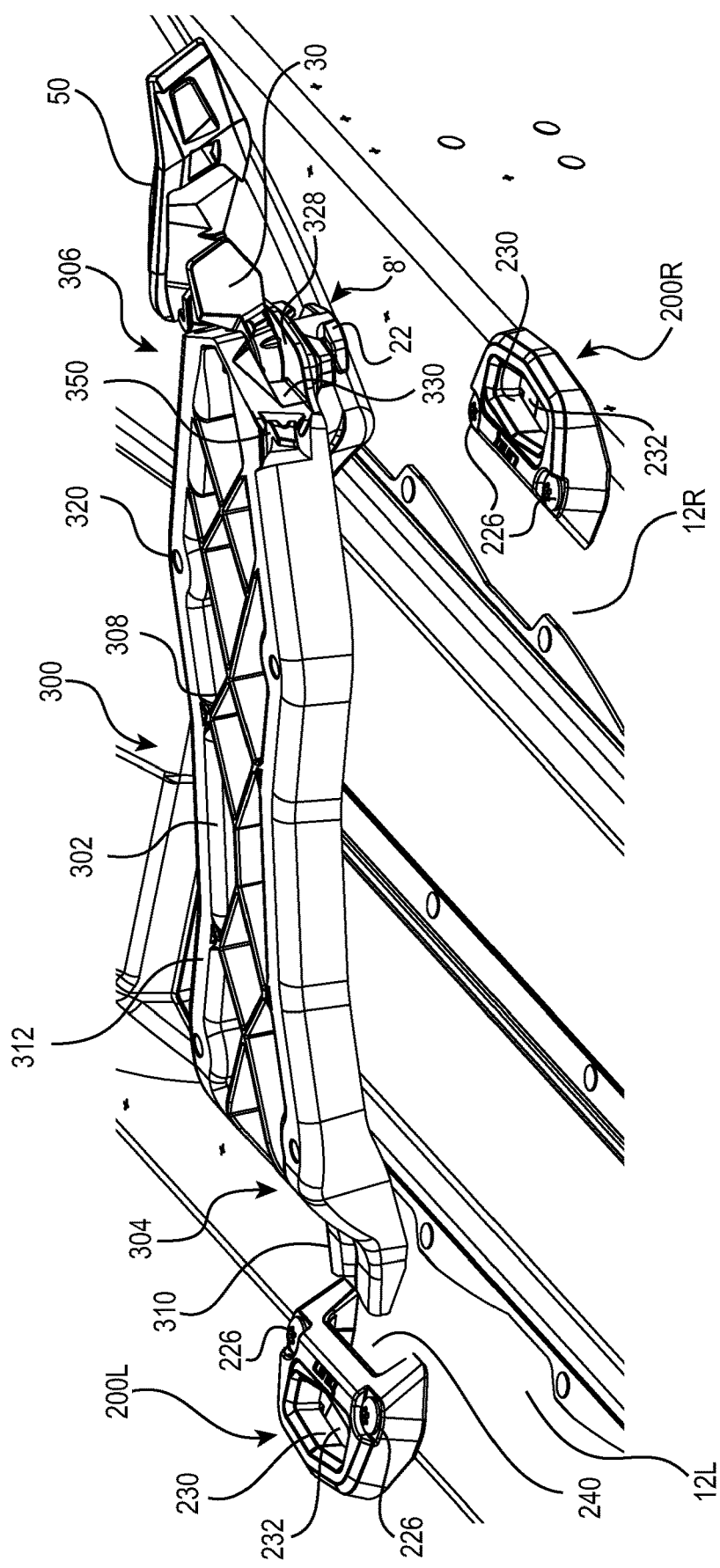
FIG. 3 is a perspective view taken from a rear, right side of a part of the snowmobile tunnel of FIG. 2A showing an accessory base with two different mounting elements for mounting to the anchor fixture of FIG. 2A.
Figure 4:
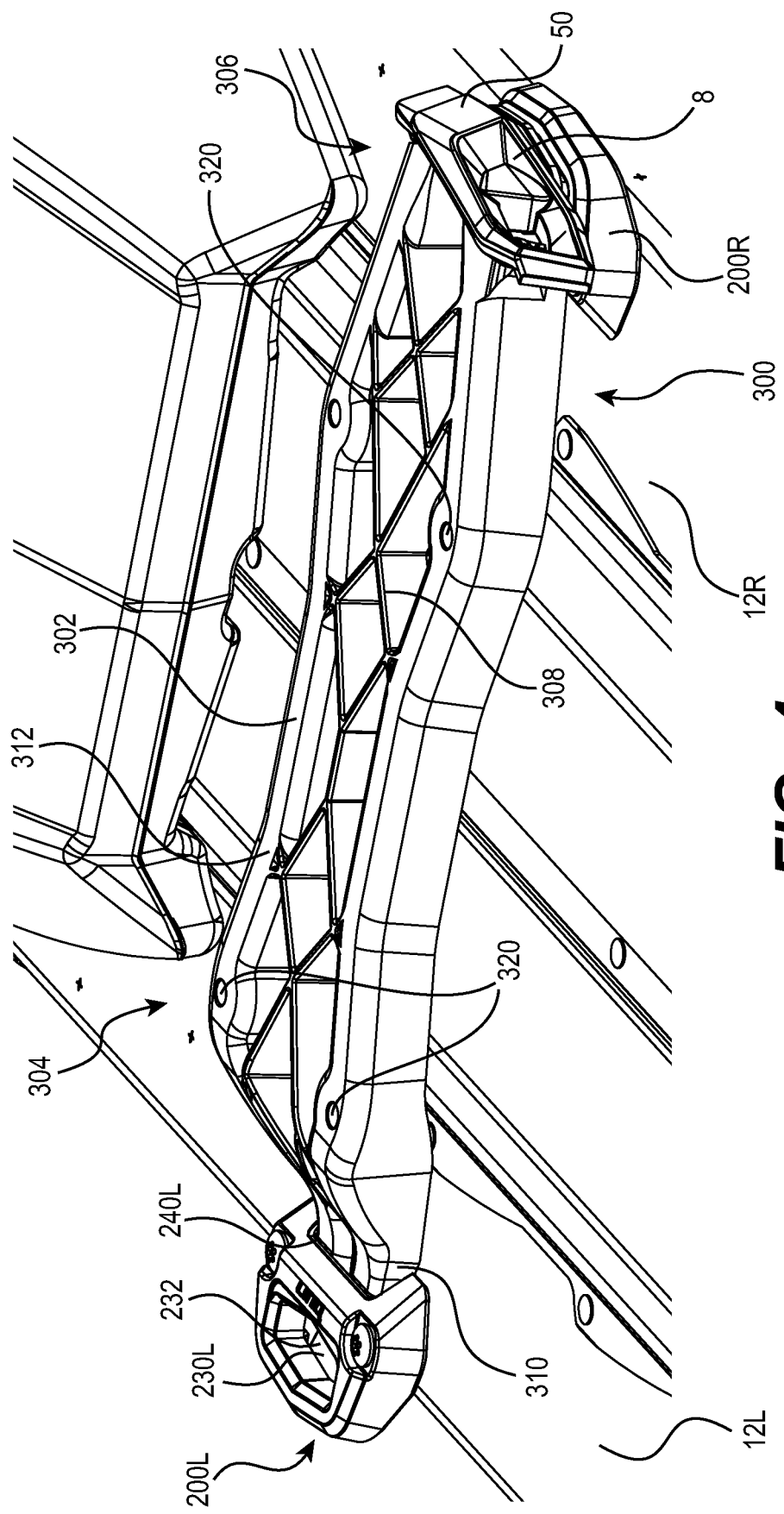
FIG. 4 is another perspective view taken from a rear, right side of a part of the snowmobile tunnel of FIG. 3 showing the accessory base mounted to the two anchor fixtures.

With reference to FIGS. 3A and 3B, the fastener aperture 240 is designed to be used with a tongue fastener 310 having a toe-in at the end that can be inserted into the fastener aperture 240 and retained within the anchor chamber 232 by the edges 240a,b,c of the fastener aperture 240 as seen in FIG. 4. The toe-in of the tongue fastener 310 widens laterally (in the direction parallel to the plane of the upper surface 312 of the frame 302) allowing it to be inserted into the fastener slot 240 until it fits tightly. Other structures are contemplated for the toe-in. It is also contemplated that additional restraining structures such as posts or hooks could be associated with the fastener aperture 240 to engage the tongue fastener 310, or portions of the tongue fastener 310. For example, the fastener aperture 240 could have a post extending into the anchor chamber 232 to engage and retain a tongue fastener 310 having two prongs at the end.

As will be discussed in further detail below, the anchor fixture 200 is designed to be used simultaneously by an anchor 8 and a tongue fastener 310. When both the anchor lock 22 and the toe-in 310 are simultaneously inserted in the anchor chamber 232, the anchor lock 22 is disposed above the toe-in part 311 of the tongue fastener 310. It is contemplated that the anchor chamber 232 could therefore have a different shape in the lower portion where the toe-in 310 is disposed than in the upper portion where the anchor lock 22 is disposed. For example, the anchor chamber 232 could have a trapezoidal shape in the lower portion adjacent to the base 22 and an elliptical shape in the upper portion adjacent to the anchor aperture 230. It is also contemplated that the anchor chamber 232 could be designed such that the anchor lock 22 and the toe-in 310 simultaneously inserted in the anchor chamber 232 are disposed on the right and left portions of the anchor chamber 232 or in the front and back portions of the anchor chamber 232.

Figure 7A:
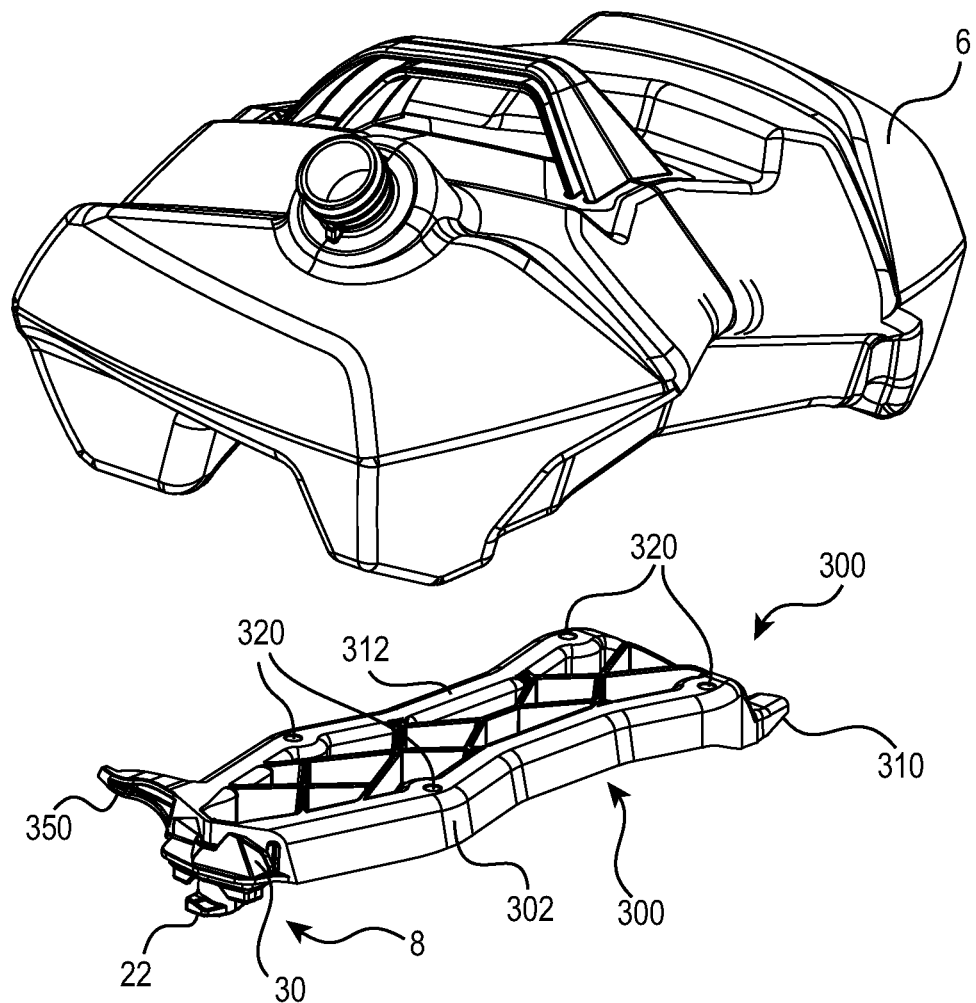
FIG. 7A is a perspective view taken from a front, right side of the jerry can of FIG. 1 and the accessory base of FIG. 3.
Figure 7B:
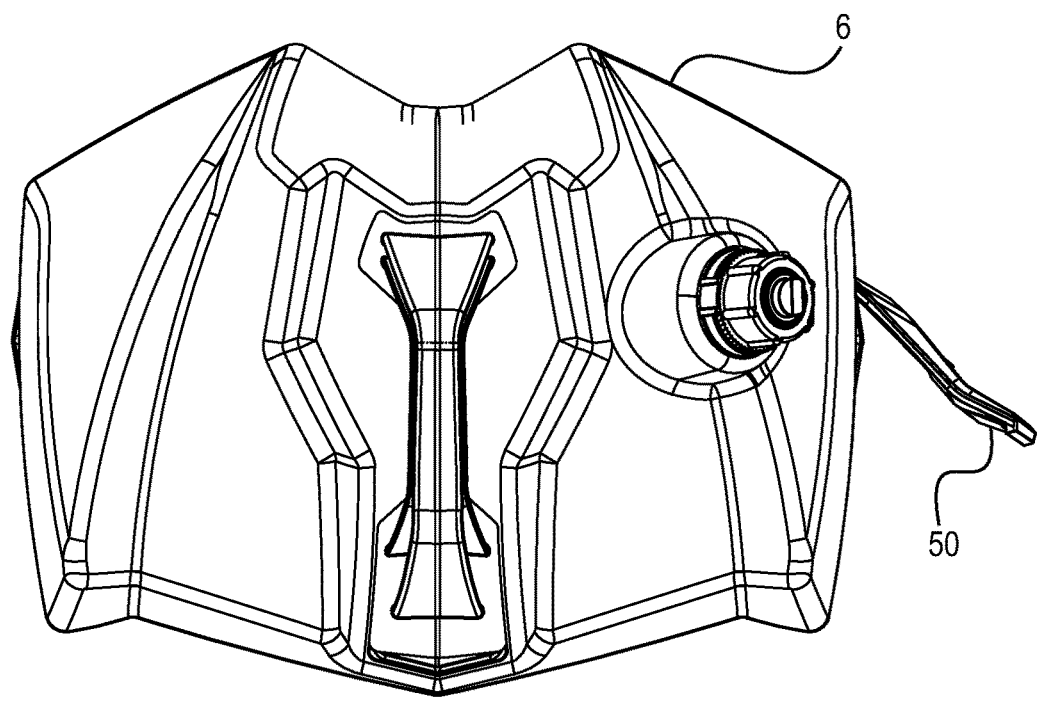
FIG. 7B is a top plan view of the jerry can of FIG. 7A mounted on the accessory base with the anchor in an unlocked position and the strap in an open position.
Figure 7C:
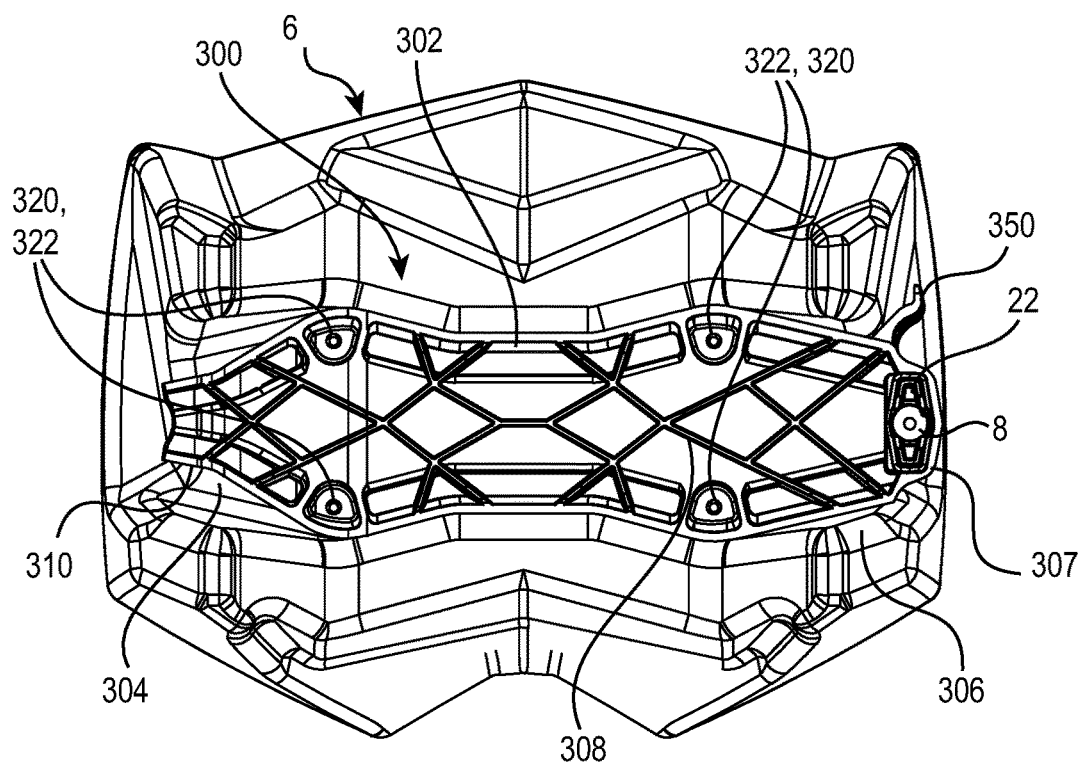
FIG. 7C is a bottom plan view of the jerry can of FIG. 7A mounted on the accessory base with the anchor in an unlocked position and the strap removed.
Figure 8B:
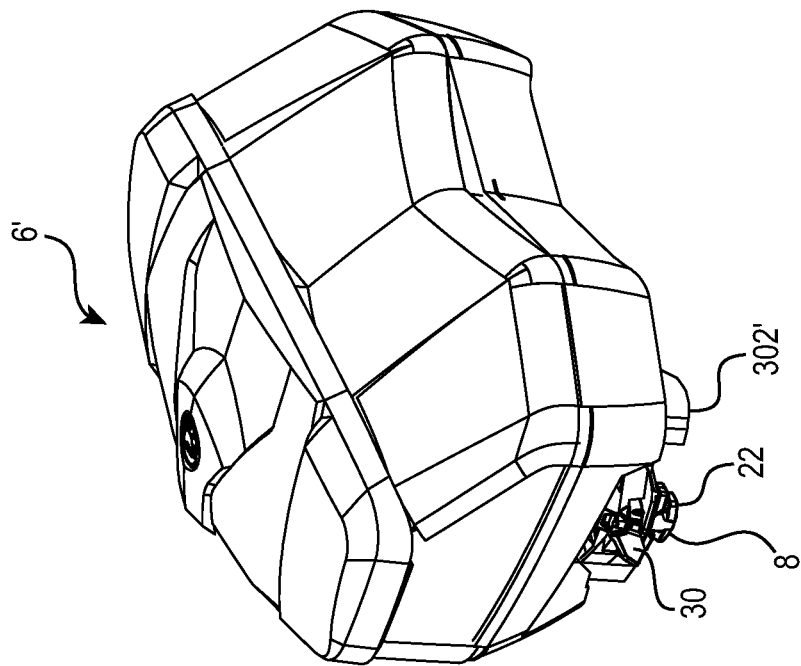
FIG. 8B is a perspective view taken from a rear, left side of the bag and an accessory base of FIG. 8A shown in an assembled configuration.
Figure 8A:
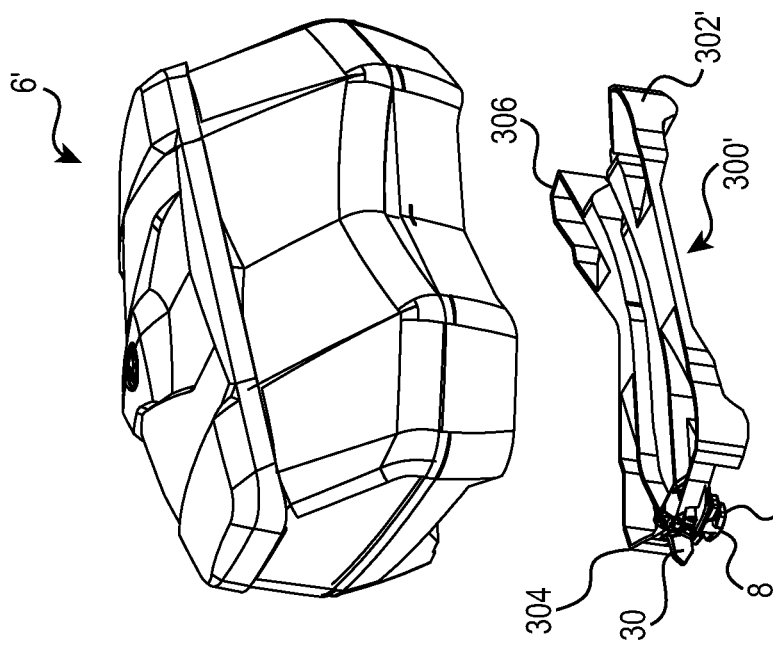
FIG. 8A is a perspective view taken from a rear, left side of a bag and an accessory base according to a second embodiment.
Figure 9A:
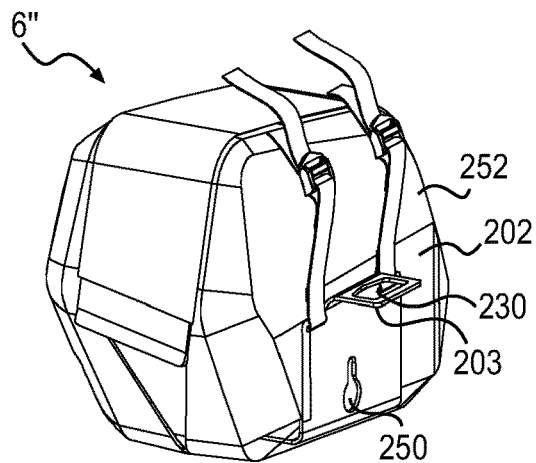
FIGS. 9A-9C are various views of a side bag having an anchor bracket.
Figure 9B:
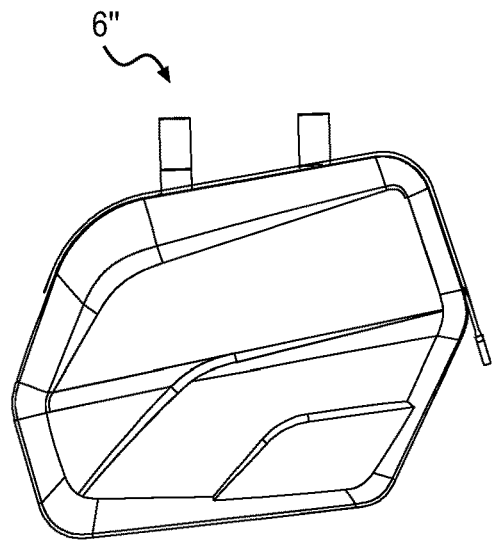
Figure 9C:
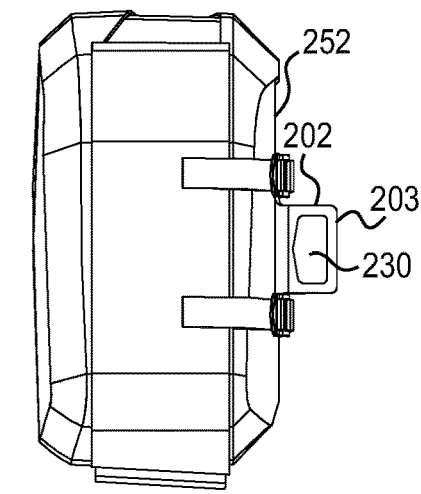

Referring now to FIGS. 3 to 9, the anchor fixture 200 can be used to attach different kinds of accessories 6, such as a jerry can 6, bag 6', sidebag 6", and the like, to a vehicle surface. The anchor fixture 200 could also be used to attach accessories having different attachment structures. The anchor aperture 230 could be used to attach accessories 6 having an anchor 8 integrated with the accessory 6. The anchor aperture 230 of the fixture 200 could also be used in conjunction with an anchor 8, to attach an accessory having an accessory anchor aperture 232 defined in the accessory body or in an anchor bracket 202 (FIG. 9) connected to the accessory body 6' (FIG. 9). The fastener aperture 240 could be used to attach an accessory 6 having a tongue fastener 310 attached to the accessory body 6. Different kinds of accessories and attachment systems thereof will be described below in further detail.

An accessory without any of the attachment structures mentioned above can be attached to a vehicle surface by attaching to the accessory an accessory base designed to be used with the anchor fixture 200. With reference to FIGS. 3 to 8, an accessory base shown generally as 300 comprises a frame 302, with a tongue fastener 310 at a first end 304 of the frame 302 and an anchor 8 integrated with the frame 302 at the opposite end 306. The frame 302 has several criss-crossing ribs 308 providing support to the accessory 6. The lever 30 of the anchor 8 disposed above the frame 302 while the anchor lock 22 connected to the lever 30 is disposed below the frame 302.

Figure 5A:
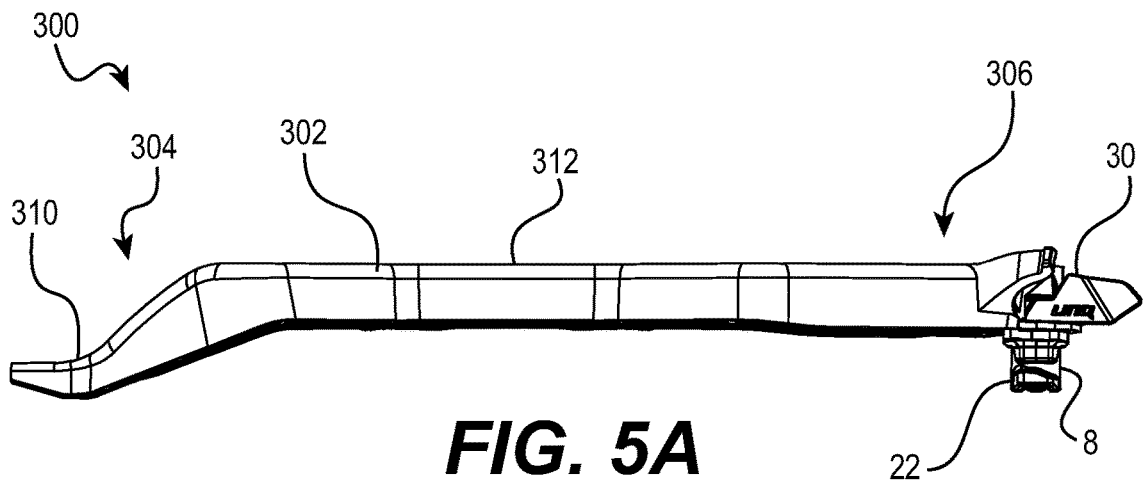
FIGS. 5A, 5B and 5C are respectively a rear elevation view, a bottom plan view and a front elevation view of the accessory base of FIG. 3, showing the anchor and a lever of the anchor, respectively in an unlocked and open position.
Figure 5B:
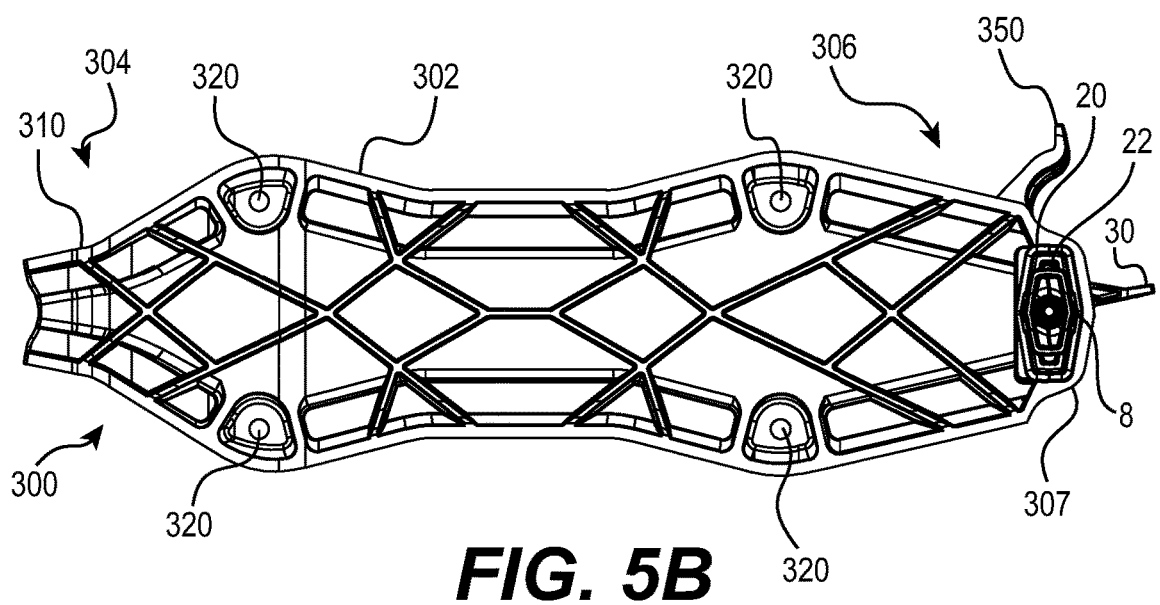
Figure 5C:
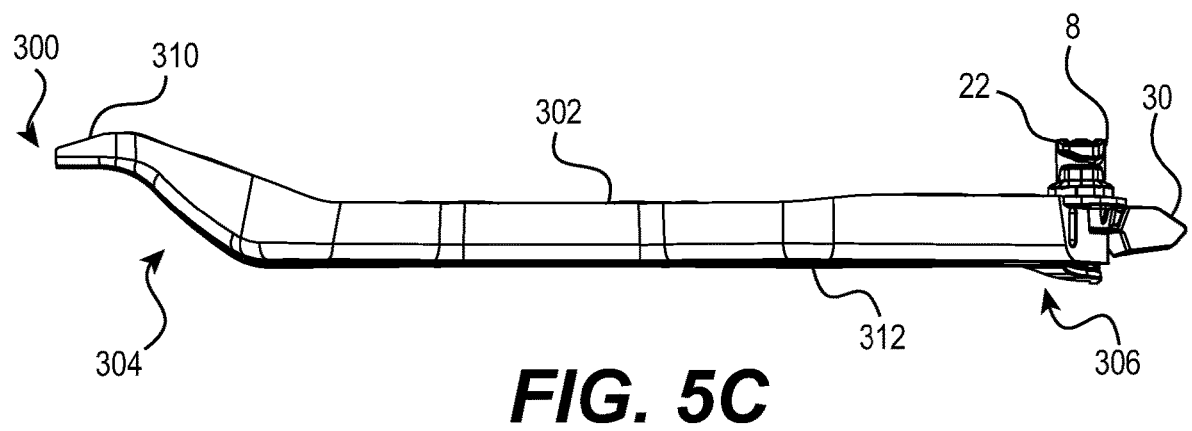
Figure 6A:
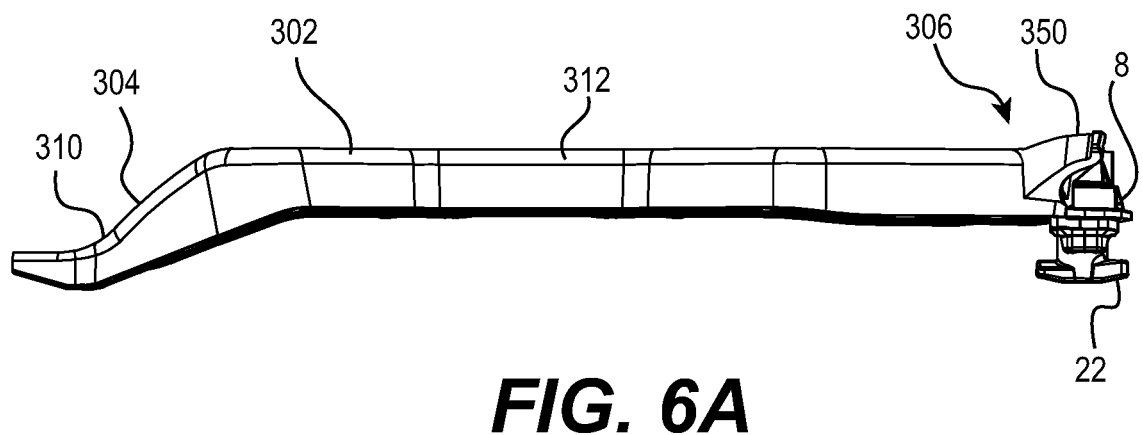
FIGS. 6A, 6B and 6C are respectively a rear elevation view, a bottom plan view and a front elevation view of the accessory base of FIG. 3, showing the anchor and the lever respectively in a locked position and a closed position.
Figure 6B:
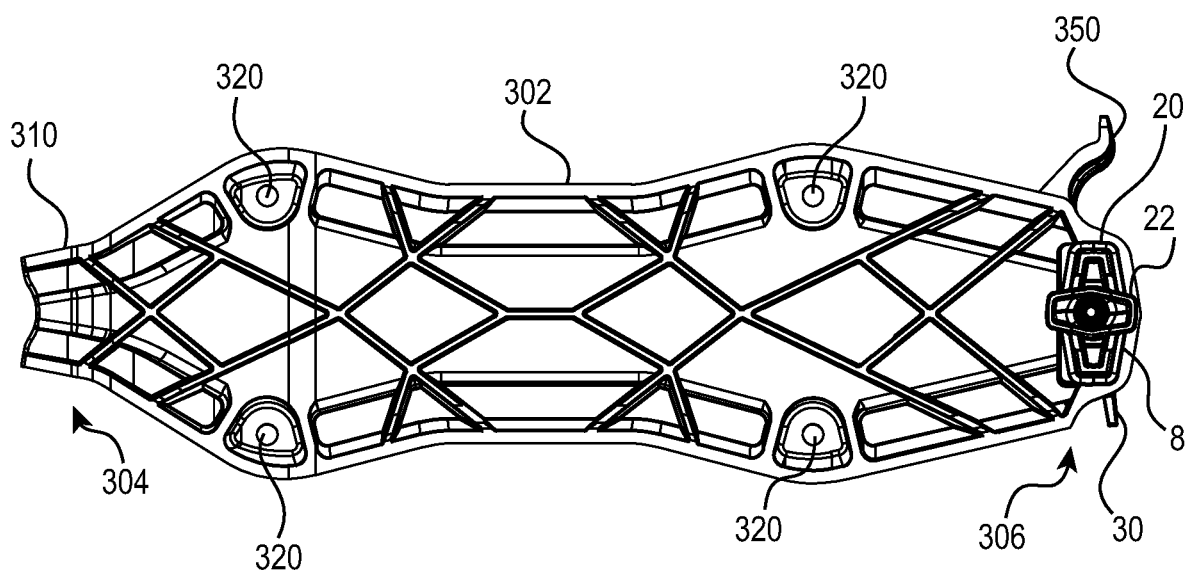
Figure 6C:
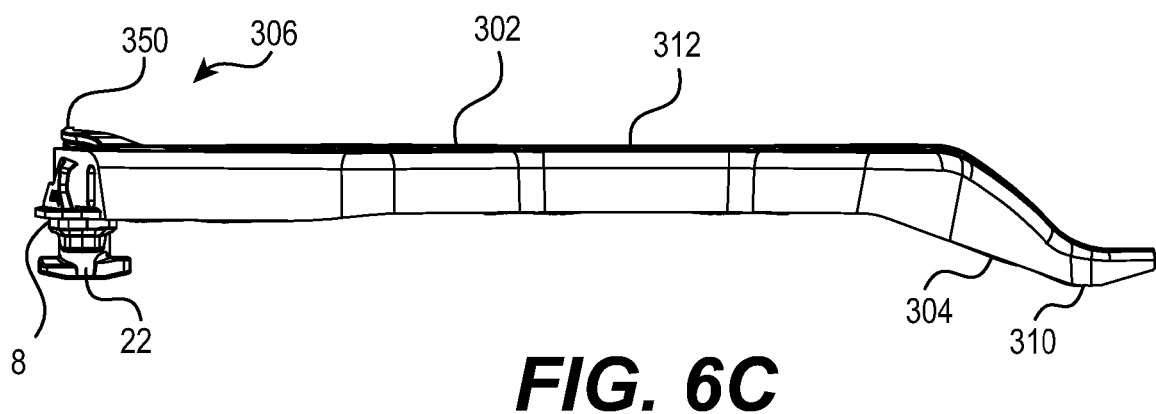

The lever 30 is used to rotate the anchor lock 22 between the locked position and unlocked position as mentioned above. In the unlocked position of the anchor 8, the open lever 30 extends outwards from the frame 302. The lever 30 is turned clockwise (when looking down from above the accessory base) in the groove 328 provided in the frame 302 for the lever 30 to lock the anchor 8. In the locked position of the anchor 8, the closed lever 30 is disposed adjacent to the frame 302 in the groove 328 and not extending outwards as in the unlocked position. Thus, when the anchor 8 is locked, the lever 30 is less likely to be accidentally pushed keeping the anchor 8 securely in lock position. In the unlocked position, the elongated anchor lock 22 is disposed parallel to the anchor base 20, and to the edge 307 of the frame 302 as can be seen in FIGS. 5A to 5C 5B. In the locked position, the anchor lock 22 is disposed perpendicular to the edge 307 of the accessory frame 302 as can be seen in FIGS. 6A to 6C.

With reference to FIGS. 3, 4 and 7B, a strap 50 is provided on the frame 302 and attached thereto on one side of the anchor 8. The strap 50 can be extended over the closed lever 30 and hooked to a tab 350 on the frame 302 on the other side of the anchor 8. In FIG. 4, the anchor 8 is in a locked position, the lever 30 is closed, and the strap 50 is attached over the anchor 8. When the lever 8 is unlocked, the strap 50 is left hanging loosely from the frame 302, as seen in FIG. 3, and thereby providing a noticeable visual indication that the anchor 8 is unlocked. The strap 50 is made of rubber, however, it is contemplated that the strap 50 can be made of any flexible material. The strap 50 can also be detachable from the frame 302 so that it can be reused with other accessories 6 or other fixtures 200.

With reference to FIGS. 3 and 4, the accessory base 300 is mounted to two oppositely facing anchor fixtures 200L, 200R on the upper surfaces 12L, 12R on either side of the tunnel 4. The tongue fastener 310 is first inserted into the fastener aperture 240 of the fixture 200L. The tongue fastener 310 is retained in the anchor chamber 230 by the edges 240a,b,c, allowing the accessory base 300 to be braced against the anchor fixture 200L while it is installed into the anchor fixture 200R. The anchor 8 at the end 306 of the accessory base 300 is then inserted into the anchor aperture 230 of the anchor fixture 200R with the anchor 8 disposed in an unlocked position. Once the anchor 8 is inserted and the lever 30 is locked, the rubber strap 50 is extended over the lever 30 and attached to the hook 350 on the other side of the anchor 8 as seen in FIG. 4.

With reference to FIG. 7A to 8C, the accessory base 300 is attached to an accessory 6 by fasteners 322. An accessory 6 such as the jerry can 6 shown in FIGS. 1B and 7, and the bag 6' shown in FIG. 8, can be mounted on the upper surface 312 of the frame 302 and fastened to the frame 302 with fasteners 322 inserted through holes 320 provided in the frame 302. The accessory base 300 with the accessory 6, 6' mounted thereon can be installed in the fixtures 200 as shown in FIG. 1B.

When viewed from directly above the accessory 6, the accessory base 300 is hidden from view underneath the accessory 6. When the anchor 8 is in the unlocked position, the lever 28 and rubber strap 50 extend out from beneath the accessory 6 as can be seen in FIG. 7B. In some embodiments, the anchor 8 is attached to the accessory base 300 such that the anchor base 20 extends out from beneath the accessory 6, 6' in the unlocked position when viewed from above. It is also contemplated that an accessory base 300 could have larger lateral dimensions than the accessory 6 so that a greater portion of the base 20 is visible when viewing the accessory 6 mounted on the accessory base 300 from above. The accessory base 300 can be adapted for specific accessories, or it can be made generally usable for accessories of different dimensions.

The tongue fastener 310 is disposed on the left side 304 of the frame 302 at a lower level than the anchor 8, as can be seen in FIGS. 5A and 6A, to enable the accessory 6 to be disposed horizontally when the frame 302 is mounted on the fixtures 200 on opposite upper surfaces 12L, 12R of the tunnel 4 of the snowmobile 1. The tongue fastener 310 and the anchor base 20 are integrally attached to the frame 302, however, it is contemplated that the anchor 8 could be removably attached to the frame 302 (or to the anchor fixture 200). An anchor aperture 230 could be provided on the frame 302 for the removable attachment of the anchor 8, or an anchor bracket 202 having an anchor aperture 230 could be attached to the frame 302 for using the anchor 8 to attach an accessory 6 to a vehicle surface 12 as can be seen in FIG. 9. This would be a useful feature, for instance, for using the accessory base in different configurations, such as spacing or orientation, of anchor fixtures 200 in different vehicles, or in different parts of the same vehicle. Similarly, it is also contemplated that a tongue bracket 310 with a toe-in 311 could be separate from the accessory base 300 and fastened thereto.

The accessory 6 of FIGS. 1B, 7A-7C and 10C-10D is a jerry can 6 used on a snowmobile 1 to transport fuel. The jerry can 6, is shown uncapped in FIG. 7A and capped in FIG. 7B. The jerry can 6 is shown with the lever 30 and the rubber strap 50 attached in FIG. 7B and with the rubber strap 50 removed in FIG. 7C.

The accessory 6' of FIG. 8 is a bag 6' mounted on an accessory base 300' according to a second embodiment. Corresponding features of the accessory bases 300 and 300' that are similar have been marked with the same reference number and will not be discussed herein in detail. Features of the accessory base 300' that are different from the corresponding features of the accessory base 300 have been marked with an apostrophe after the reference number. Instead of criss-crossing ribs 308, the frame 302' of the accessory base 300' has a substantially continuous surface 312'. An anchor 8 is attached on the left end 304' and a tongue fastener (not visible) on the right end 306' of the frame 302'.

The accessory 6" of FIGS. 9 and 10 is a side bag 6" having a different attachment mechanism compared to the jerry can 6 or bag 6' which are laterally elongated and attached to two laterally spaced attachment fixtures 200 via a tongue fastener 310 and an anchor 8. The side bag 6", which is comparatively less extended in the lateral direction and more extended in the vertical direction than the jerry can 6 and bag 6'. The side bag 6" has an anchor bracket 202 attached in the center of a vertically extending surface 252 which faces the side surface 13 of the tunnel 4 when the side bag 6" is mounted thereon. A keyhole shaped pin-slot 250 is defined in the surface 252 directly below the anchor bracket 202 towards the bottom of the surface 252.

The anchor bracket 202 is a flat plate 203 extending horizontally outwards from the surface 252, and having an anchor aperture 230 defined in the center thereof to receive an anchor 8. The bracket 202 can be used to anchor the sidebag 6" to another anchor bracket 202, or to an anchor fixture 200, using an anchor 8. FIG. 10B shows another embodiment of an anchor bracket 202'. The anchor bracket 202' is similar to the anchor bracket 200 except that the bracket 202' has surfaces 204 extending downwards from the edges of the horizontal plate 203 perpendicular to the surface 252 and from the edge of the plate 203 adjacent and parallel to the surface 252. The surfaces 204 are designed to fit around the exterior surfaces 216, 218 and 220 of the anchor fixture 200 while leaving the tongue fastener aperture 240 unobstructed. The surfaces 204 aid in aligning the anchor apertures 230 of the anchor bracket 202' and anchor fixture 200, and in preventing the anchor bracket 202' from sliding laterally off the anchor fixture 200 before being fastened with an anchor 8.

A pin 254 (FIG. 10A), having a head and a stem, can be locked in the key-hole shaped slot 250 by inserting the pin-head into the centre of the circular portion of the key-hole shaped slot 250 and then displacing the pin 254 along the linear section so that the pin 254 cannot be removed from the slot 250 since the linear section has a narrower width than the pin-head. The pin 254 and key-hole shaped slot 250 are used to fasten the side bag 6" to the vertical surface 13 having the pin 254 and extending below the horizontally disposed surface 12 having the anchor fixture 200 disposed above the pin 254. The side bag 6" is fastened with the pin 254 to provide stability to the side bag 6" after the anchor bracket 202, 202' of the side bag 6" has been placed on an anchor fixture 200 and before the anchor bracket 202, 202' has been fastened with an anchor 8. It is contemplated that the anchor bracket 202, 202" could be disposed at a non-normal angle to the surface 252 and the side bag 6" could be mounted to adjacent surfaces 13 at an angle other than perpendicular to each other. It is also contemplated that multiple slots 250 and multiple anchor brackets 202 could be provided for mounting sidebags 6", for example, if the side bag 6" is longer or wider than the one shown in FIG. 8, or if the side bag 6" is designed to carry relatively heavier items.

Figure 10A:
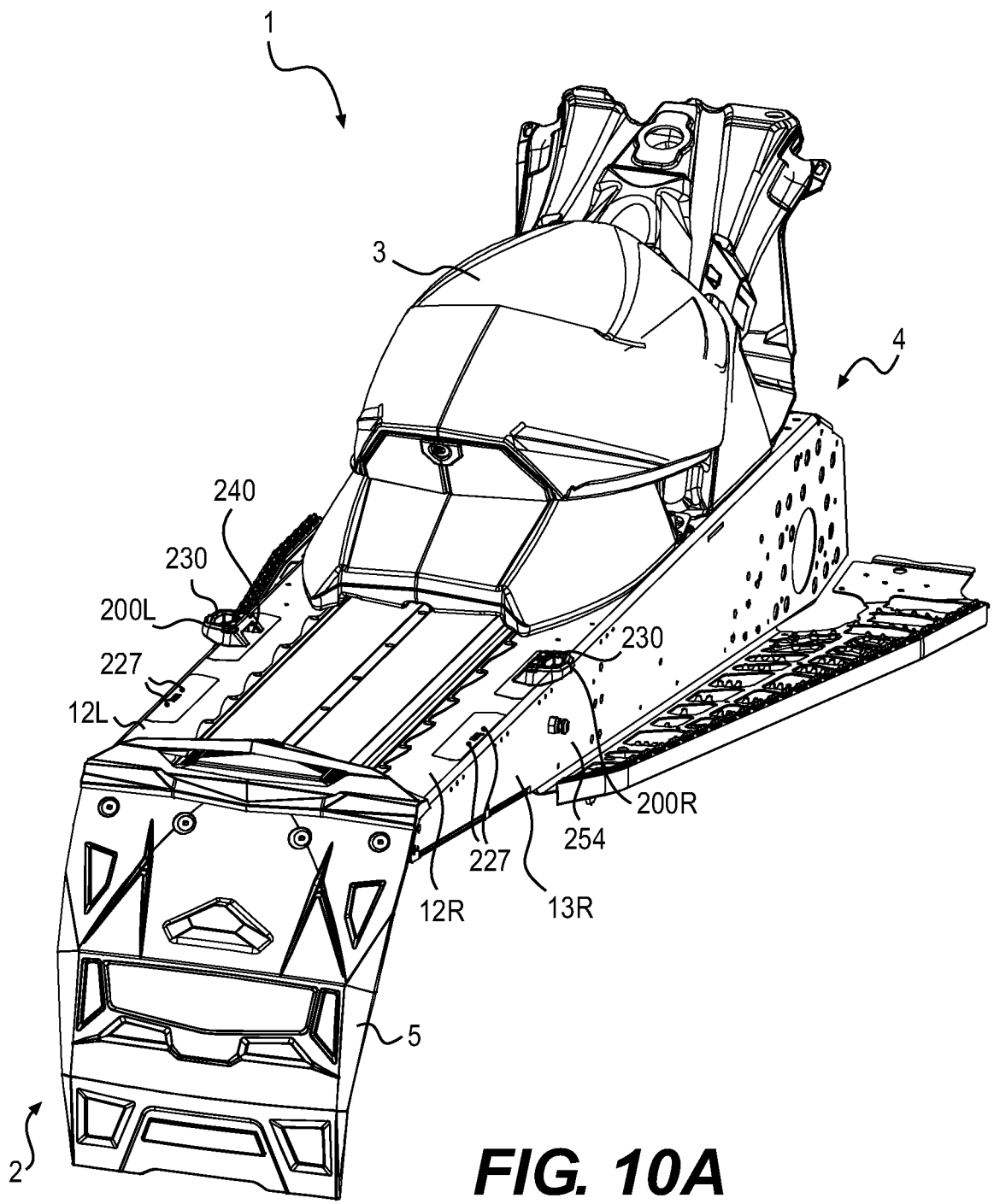
FIGS. 10A-10D are perspective views of portions of the snowmobile taken from a rear, right side thereof illustrating the steps for mounting two side bags and a jerry can to the tunnel of the snowmobile.
Figure 10B:
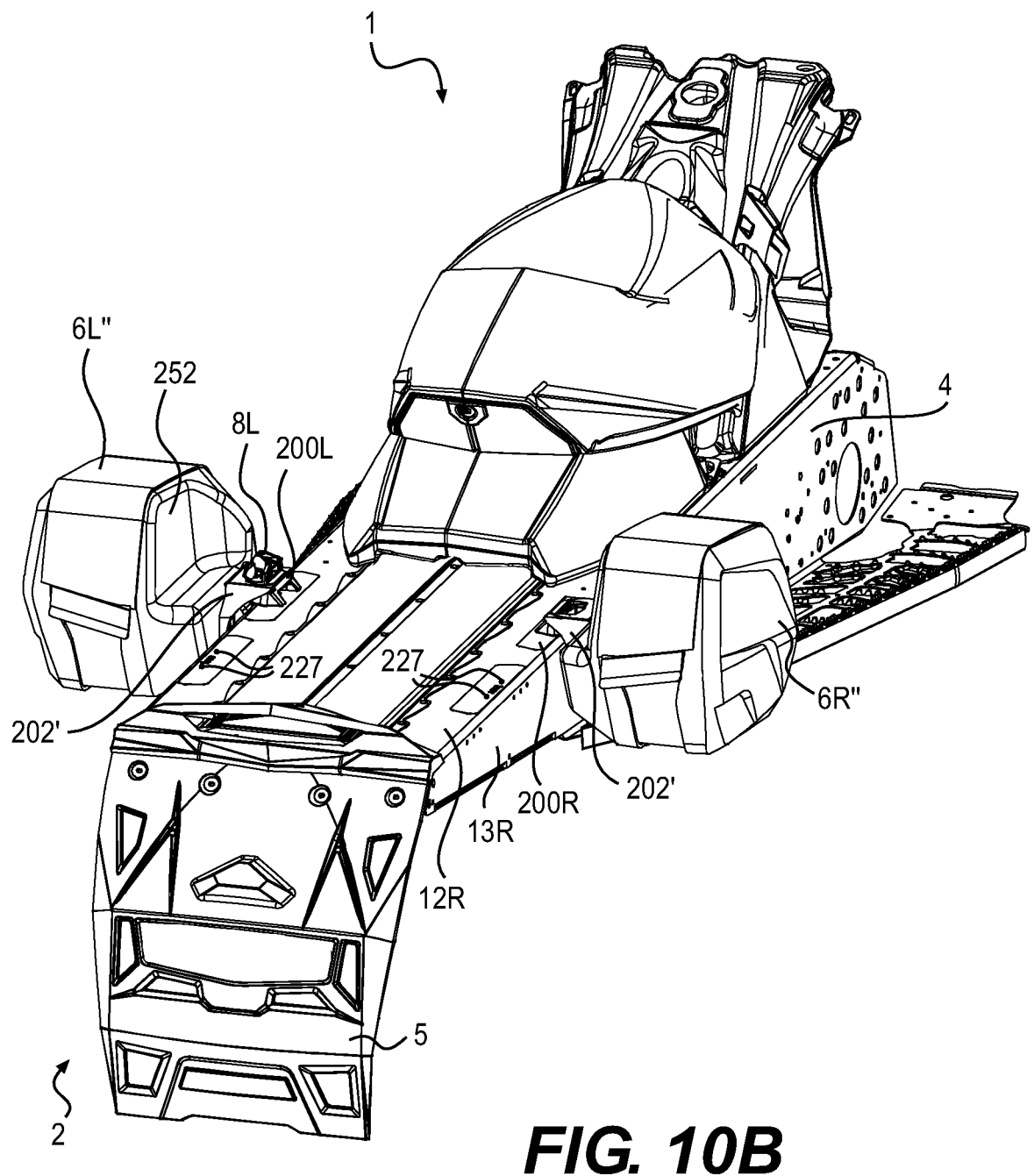

With reference to FIGS. 10A to 10D, the use of anchor fixtures 200 for the attachment of multiple accessories to a vehicle surface will now be discussed. Referring to FIG. 10A, the accessories are mounted on the tunnel 4 of a snowmobile 1. The tunnel 4 has anchor fixtures 200L and 200R attached on opposite sides on the top left 12L and top right 12R surfaces. A pin 254 is mounted on each side surface 13R and 13L below the respective anchor fixtures 200R and 200L.

Referring to FIG. 10B, sidebags 6L" having anchor brackets 202L' and sidebag 6R" having the anchor bracket 202R' are first mounted respectively on the anchor fixtures 200L and 200R such that the anchor aperture 230 of each anchor fixture 200L, 200R is aligned with the anchor aperture 230 of the corresponding anchor bracket 202L, 202R'. The key-hole shaped slots 250 of each sidebag 6L", 6R" is engaged with the corresponding pin 254L, 254R on the corresponding side surfaces 13L, 13R of the tunnel 4 to support the sidebags 6L", 6R" before being fastened to the respective anchor fixture 200L, 200R. The sidebag 6L" is fastened to the anchor fixture 200L with an anchor 8L.

Figure 10C:
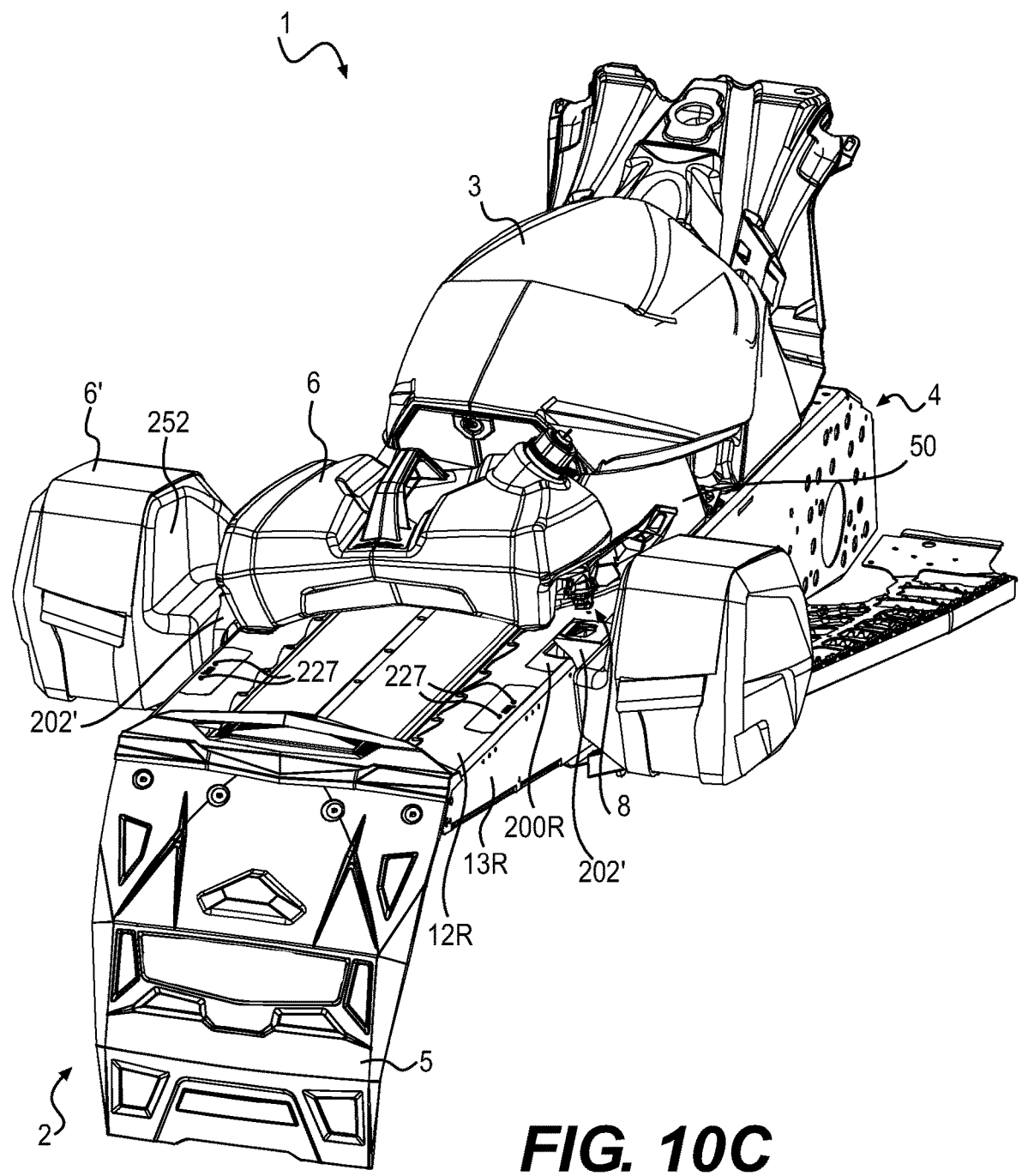

Referring to FIG. 10C, a jerry can 6 mounted to an accessory base (not shown) having a tongue fastener 310 on the left side and an anchor 8 on the right side is then mounted on the anchor fixtures 200L and 200R. The tongue fastener 310 of the jerry can 6 is fastened before the anchor 8. The fastener aperture 240L of anchor fixture 200L is used to fasten the tongue fastener 310 of the jerry can 6 as seen in FIG. 10C.

Figure 10D:
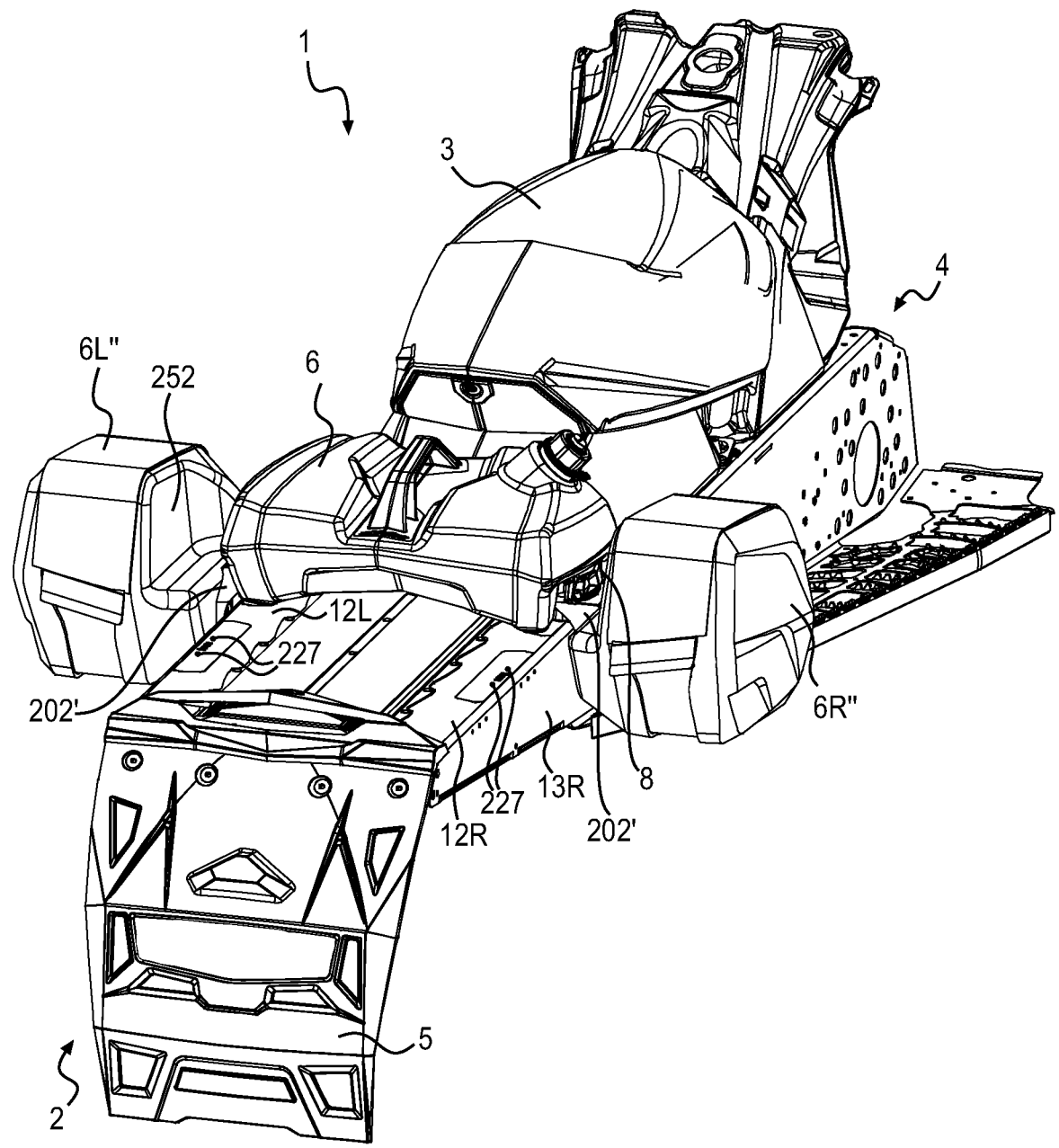

Referring to FIG. 10D, the anchor 8 of the jerry can 6 is finally inserted into the anchor aperture 230' of the anchor bracket 202R' and the anchor aperture 230 of the anchor fixture 200R and locked, thus fastening the right side of the jerry can 6 and the sidebag 6" to the anchor fixture 200R, and thereby achieving the installation of three accessories 6, 6L" and 6R" on the tunnel 4 of the snowmobile 1.

Turning now to FIGS. 11 to 14, a second embodiment of a fixture 500 for detachable mounting of an accessory to a vehicle will now be described. The fixture 500 is used to mount a detachable backrest 70 for a snowmobile passenger seated in a passenger seat 3 behind the driver seat 3. The backrest 70 is attached above the tunnel 4 of the snowmobile 1 using fixtures 500R, 500L mounted respectively on the right and left sides of the tunnel 4. The backrest 70 has a frame comprising a back support portion 72 with a left armrest 74R, and a right armrest 74L respectively on the right and left sides of the back support portion 72. Each armrest 74R, 74L is connected to the back support 72 and the corresponding fixture 500R, 500L by an armrest mounting portion 76. The backrest 70 can be detached when not in use. The backrest 70 could be of the adjustable kind with mechanisms for adjusting the height and inclination etc., of the back support 72 and the armrests 74R, 74L.

The left armrest 74L is a mirror image of the right armrest 74R and the left fixture 500L is a mirror image of the right fixture 500R. Corresponding features of the left and right side armrests 74L, 74R and fixtures 500L, 500R are labeled with the same reference number, and will not be discussed separately. The terms "outer" and "inner" with respect to each fixture 500R, 500L, as used hereinafter, are with respect to the relevant tunnel side surfaces 13R,13L when the fixture 500R, 500L is attached to the tunnel 4.

Figure 13A:
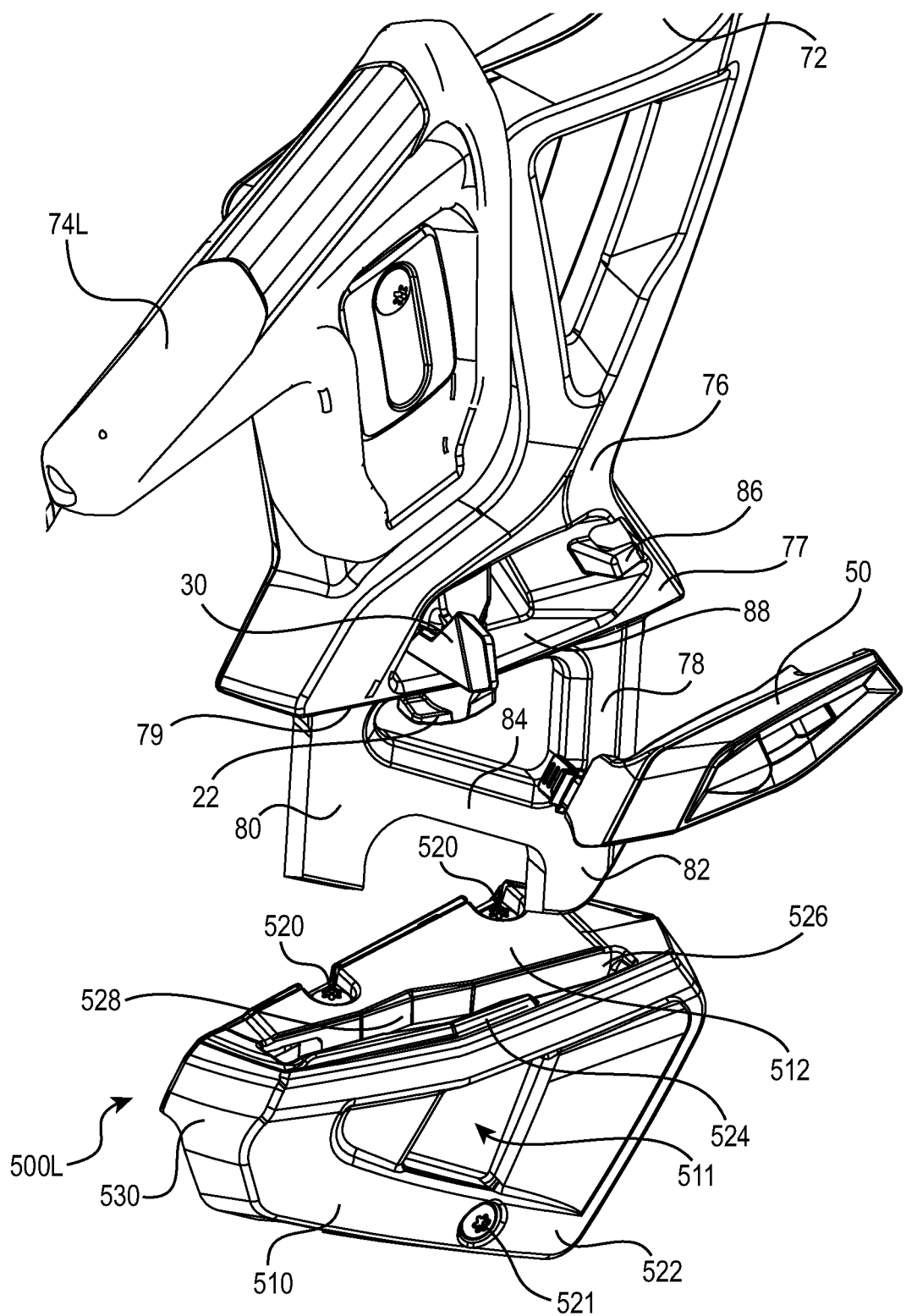
FIG. 13A is a partially exploded perspective view taken from a top, left side of the left armrest and the left fixture of FIG. 11A.
Figure 13B:
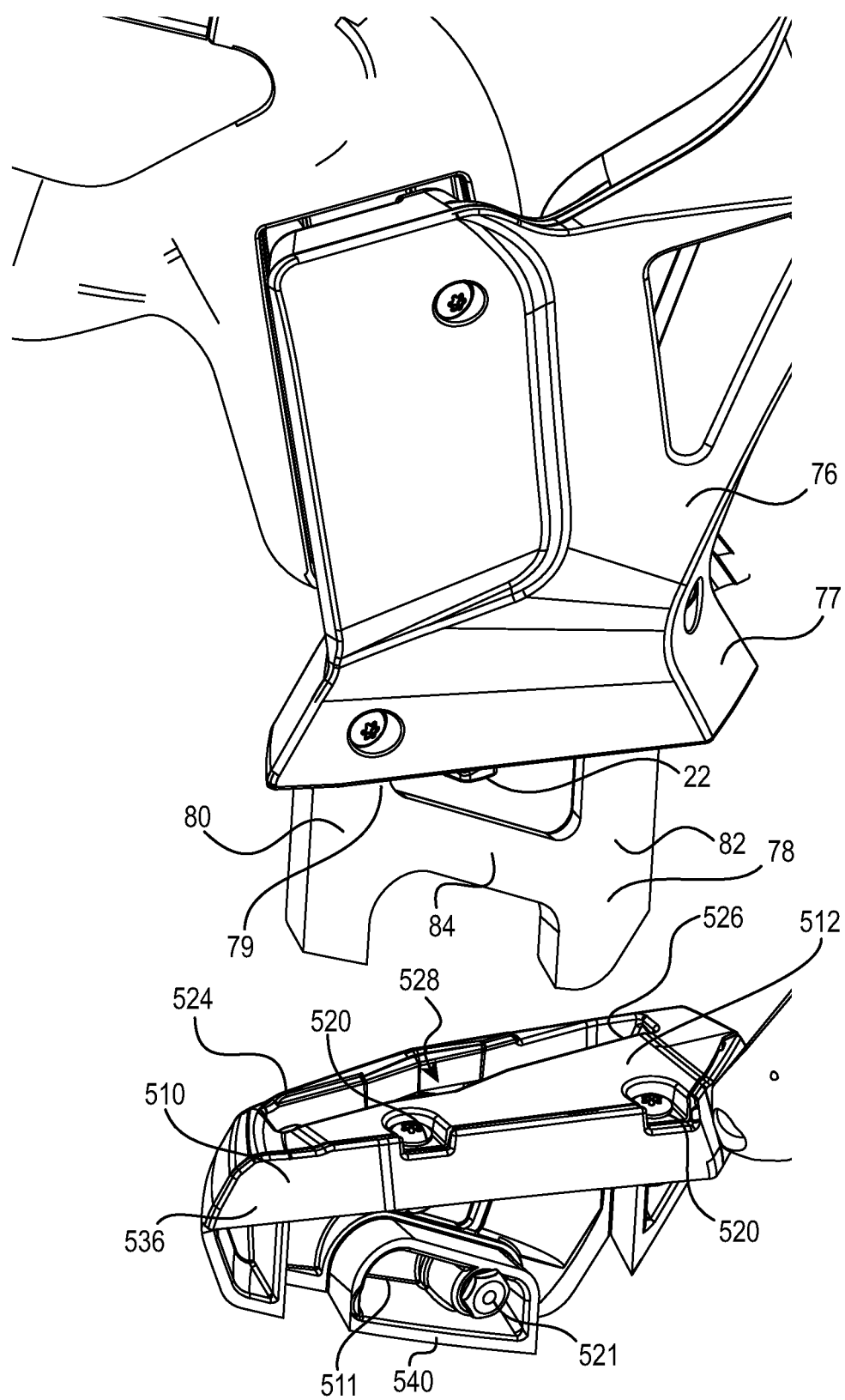
FIG. 13B is a partially exploded view taken from a top, left side of the right armrest and right fixture of FIG. 11A.

As best seen in FIG. 13A, the armrest 74 has a projection 78 extending downwards from the base 77 of the mounting portion 76. The projection 78 has two prongs 80, 82 joined by a bridge 84 extending between the prongs 80, 82. The prongs 82 and 84 are of different lengths and extend downwards from the generally horizontal mounting portion base 77 at an angle to the vertical direction.

An anchor 8 in the mounting portion base 77 serves to fasten the armrest 74 to the fixture 500. The anchor lock 22 of the anchor 8 extends below the lower edge 79 of the mounting portion base 77 in the space between the prongs 80 and 82 and above the bridge 84. A lever 30 of the anchor 8 extends outside the mounting portion 76 to move the anchor lock 22 between the locked and unlocked positions to fasten and unfasten the armrest 74 with the fixture 500. A strap 50 is attached to a hook 86 behind the lever 30. The lever 30 and the hook 86 are disposed in a niche 88 above the mounting portion base 77. The lever 30 is connected to the anchor lock 22 through the lower wall of the niche 88. A portion of the lever 30 extends out of niche 88 in the open position and is disposed within the niche 88 in the closed position. The hook 86 is attached on the rear wall of the niche 88. One end of the strap 50 is attached to the hook 86 and the other end can be extended over the lever 30 in the closed position and held between the front wall of the niche 88 and the lever 30. It is contemplated that a hook, or other attachment means could be provided on the both the front and rear walls of the niche 88 to hold the two ends of the strap 50. It is also contemplated that the anchor 8 could not be disposed in a niche, or that instead of the lever 30, a button or other actuator means be provided on the mounting portion 76 for moving the anchor lock 22 between locked and unlocked positions.

The fixture 500 has a body 510 with an upper wall 512 which is fastened to the upper surface 12 of the tunnel 4. Fastener holes 520 near the inner edge 518 are provided for attaching the fixture 500 to the tunnel 4 using the fastener holes 227 on the upper surface 12 of the tunnel 4. An outer wall 522 extends generally vertically downwards from the outer edge 516 of the upper wall 512. An elongated slot 526 in the upper wall 512 has a wider section 528 in the middle portion to allow the anchor 8, of the armrest 74 to be inserted through the slot 526. The prongs 80 and 82 of the armrest projection 78, disposed on either side of the anchor 8 of the armrest 74, enter the slot 526 on either side of the wider section 528. When inserted through the slot 526 and moved to the locked position, the anchor lock 22 engages the lower surface 550 (FIG. 14F) of the upper wall 512 directly adjacent the wider section 528 of the slot 526, and the anchor base (not shown) engages an upper surface (not shown) in the armrest mounting portion base 77, thus anchoring the armrest 74 and the fixture 500 together.

The upper wall 512 is fastened to the tunnel upper surface 12 such that the vertical outer wall 522 is spaced from the respective tunnel side surfaces 13. The upper wall 512 has a ridge 524 adjacent the outer edge 516 that engages the armrest mounting base 77 at an inner surface adjacent to the lower edge 79 of the mounting portion 76. It is contemplated that the ridge 524 could be omitted, or some other structure be used to engage the mounting portion base 77.

The vertical wall 522 has front 530 and rear 532 vertical sections wrapping around to the front and rear of the fixture 500. It is contemplated that the walls 530 and 532 could not be provided. The vertical wall 522 extends from a top outer edge 516 of the upper wall 512 to a bottom edge 514. A fastener hole 521 is defined in the outer wall 522 for attaching the fixture 500 to the tunnel side surface 13. The fixture body 510 has a gap 511 corresponding to the space between the prongs 80, 82 of the armrest projection 78 which is inserted into the fixture body 510. The gap 511 facilitates handling of the fixture 500 during attachment of the fixture 500 to the tunnel surfaces 12, 13, however, it is contemplated that the body 510 could be continuous without gaps, or that other means for handling the fixture 500 could be provided.

It is contemplated that the shapes and contours of the walls 512, 522, 530, 532 of the fixture body 510 could be different. The slot 526 could be shaped differently based on the shape of the anchor 8 and the projection 78 extending downwards from the armrest mounting portion base 77. The fixture 500 and the armrest projections 80, 82, 84 are contemplated to be symmetrical so as to be usable for attachment of accessories on either the right or the left sides. It is also contemplated to have multiple slots instead of a single slot 526.

Figure 14A:
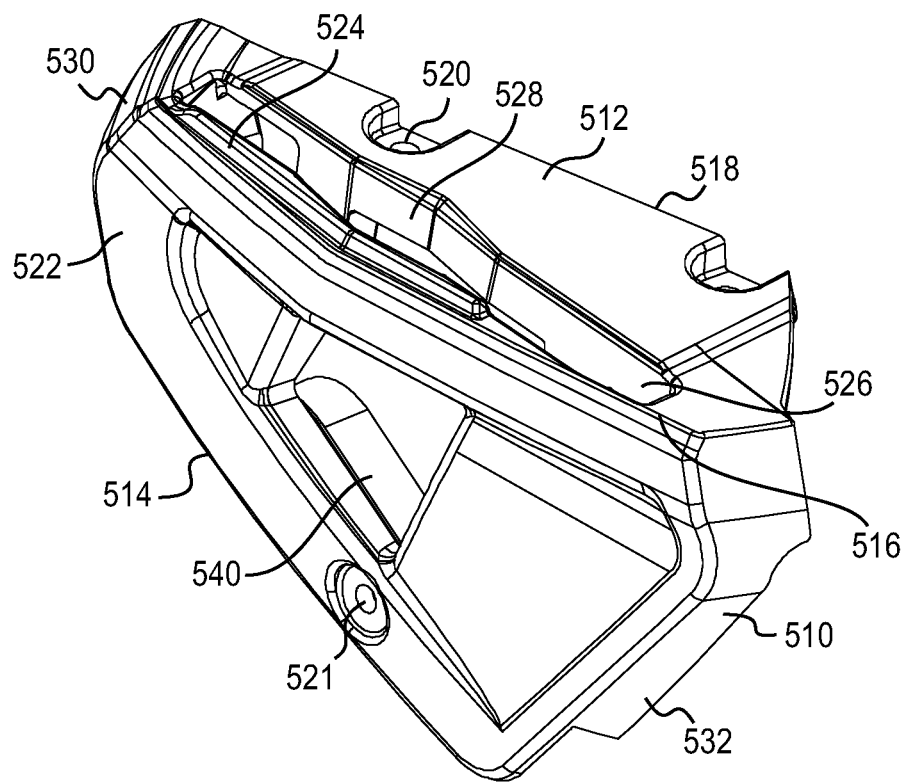
FIGS. 14A-14F are close-up views of the left fixture of the snowmobile of FIG. 11A.
Figure 14C:
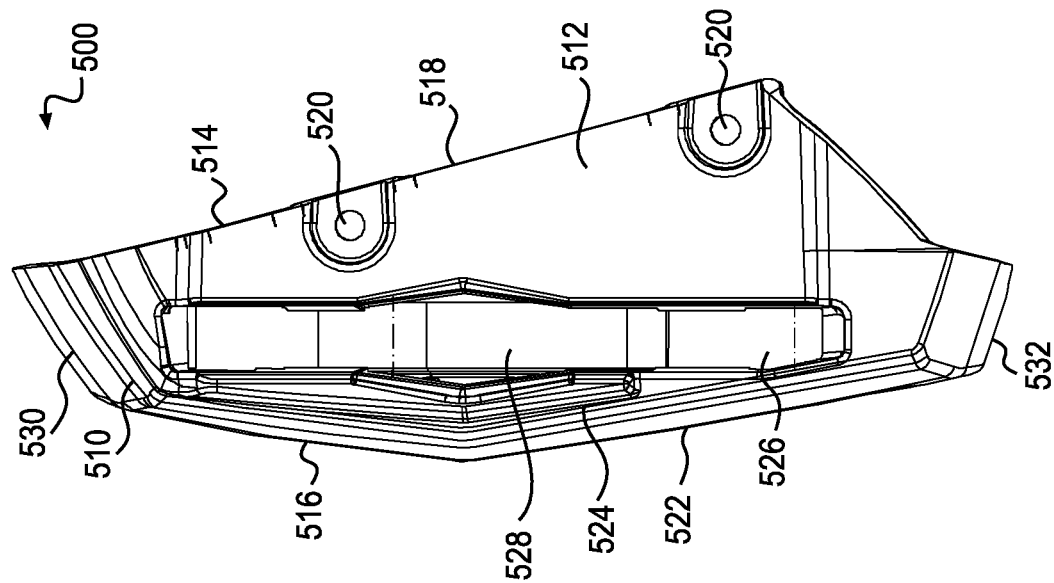
Figure 14B:
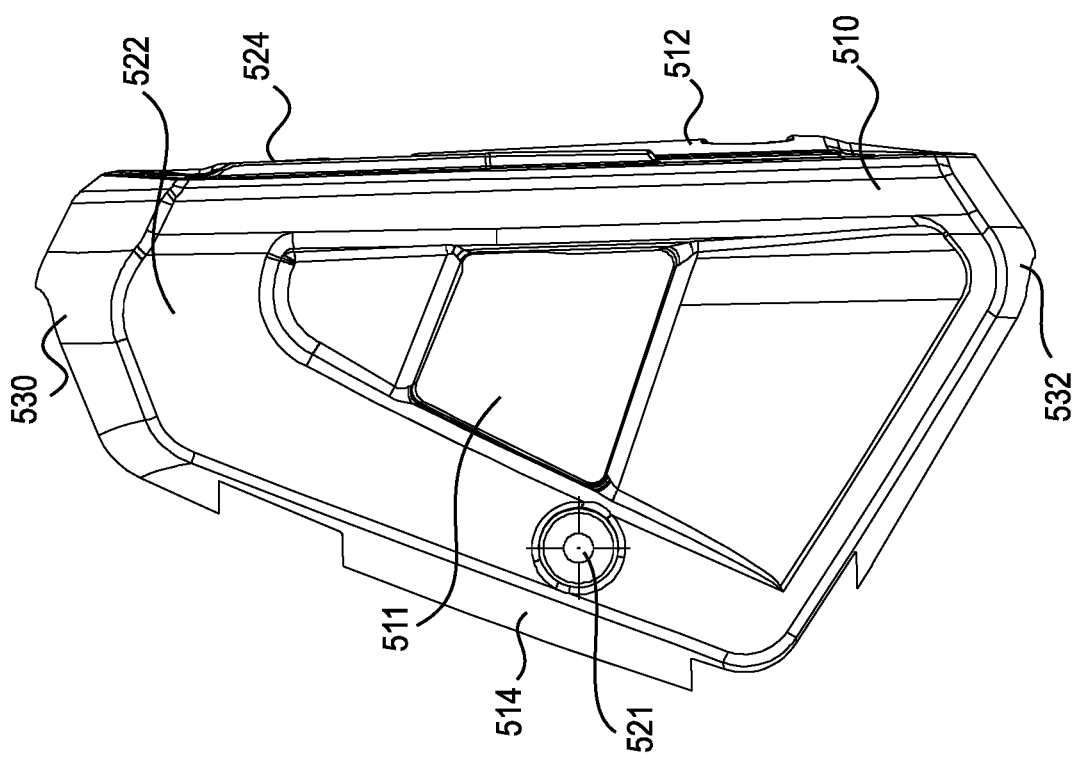
Figure 14E:
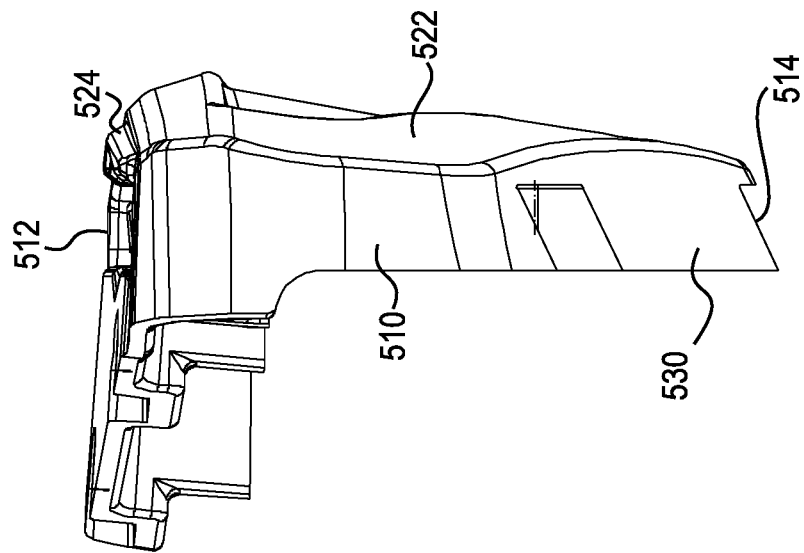
Figure 14D:
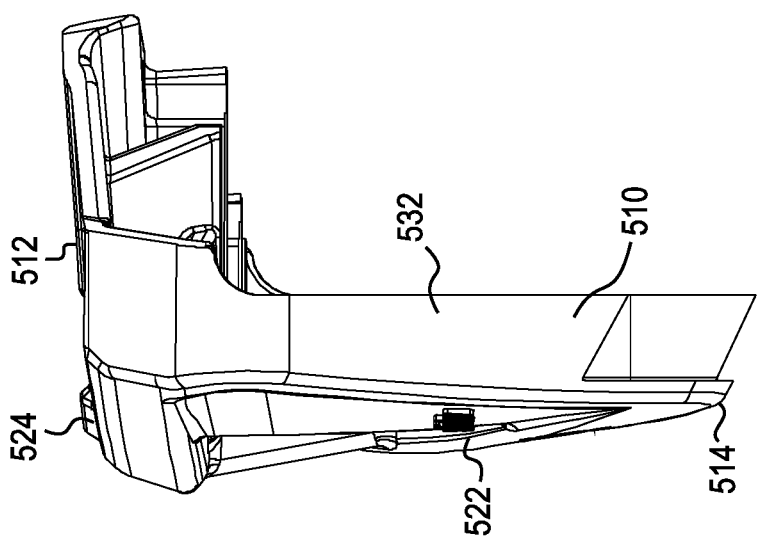
Figure 14F:
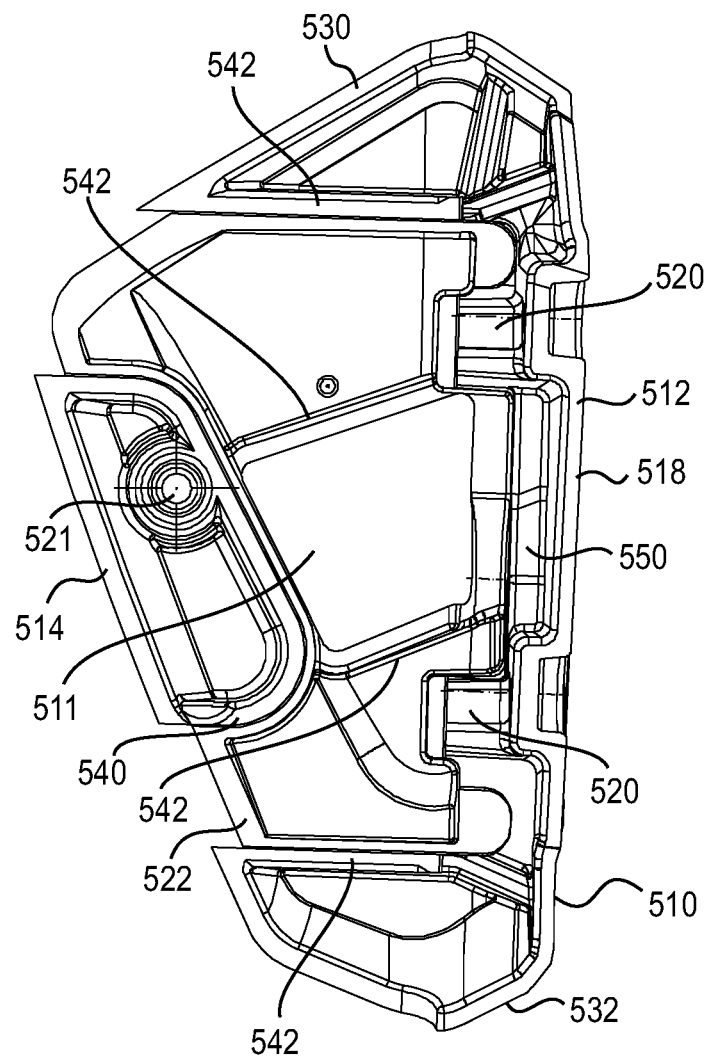

With reference to FIG. 14F, the inner surface of the vertical wall 522 has several projections extending inwards from the wall 522 towards the side tunnel surface 13 when the fixture 500 is attached to the tunnel upper surface 12. A projection 540 is shaped to mate with the lower surface of the bridge 84 and the prongs 80, 82 on the side surfaces. The projection 540 also defines the fastener hole 521. The projection 540 blocks the downward motion of the prongs 80, 82 when inserted into the fixture 500. Projections 542 which define the gap in the outer wall 522, abut the side surfaces of the prongs 80, 82 when the armrest 74 is installed in the fixture 500. The projection 540 and 542 prevent forward and backwards motion of the armrest mounted 74 in the fixture 500. The projections 540, 542 in the fixture 500 are in the form of walls and surfaces enclosing hollow spaces, however, they are contemplated to define other structures, either solid or hollow.

When the armrest 74 is fully inserted in the fixture 500, the bridge 84 is supported on the projection 540. It is contemplated that the anchor lock 22 could be aligned with the lower surface 550 of the upper wall 512 directly adjacent the wider section 528 of the slot 526 when the fixture 500 is supported on the projection 540. Thus, in the locked position of the anchor 8, the armrest 74 would be additionally held in the fixture 500 by the anchor lock 22 engaging the lower surface 550 of the upper wall 512 from underneath and the bridge 84, disposed below the anchor lock 22, engaging the upper surface of projection 540 from above.

It is also contemplated that the anchor base 20 and anchor lock 22 could engage respective upper and lower surfaces of a horizontal projection inside the fixture 500 parallel to the slot 526, instead of the lower surface 550 of the upper wall 512 and an upper surface in the armrest mounting portion base 77, in order to anchor the armrest 74 to the projection 550 and preventing it from being pulled out of the fixture 500. This configuration could be useful for instance, if the upper wall 512 has a thickness different than the separation between the anchor base 20 and anchor lock 22.

An inner plate 536 (best seen in the fixture 500R shown in FIG. 13B) extends downwards from the inner edge 516 of the upper wall 512. The inner plate 536 is removably attached to the upper wall 512 by the fasteners in the holes 520 which attach the upper wall 512 of the fixture 500 to the tunnel upper surface 12. The inner plate 536 prevents access to the portion of the interior of the body 510 extending above the level of the tunnel upper surface 12. It is contemplated that the inner plate 536 could extend further down or that the inner plate 536 not be provided. It is also contemplated that the inner plate 536 could be attached fixedly to the upper surface 512.

The fixtures 200, 500 have been described exemplarily for attaching to a tunnel 4 of a snowmobile 1, however, it is contemplated that the fixtures 200, 500 could be used with any surfaces disposed at other angles and in different locations in the snowmobile 1 or in vehicles other than a snowmobile. The fixtures and attachment mechanisms could be used for wide range of accessories not limited to the ones described herein.

What is claimed is:

1. A jerry can assembly configured to be selectively secured to a vehicle, the jerry can assembly comprising:
a jerry can comprising:
a container body for containing fuel therein, the container body defining an opening for filling and emptying the container body; and
a handle connected to the container body for carrying the jerry can;
and
a base connected to the jerry can, the base comprising:
a frame connected to the container body of the jerry can, the frame having a first end and a second end;
a tongue disposed at the first end of the frame; and
an anchor disposed at the second end of the frame, the anchor being configured to secure the jerry can assembly to the vehicle,
the anchor comprising an anchor base and an anchor lock extending downward from the anchor base, the anchor lock being adapted to selectively engage an anchor fixture of the vehicle to secure the jerry can assembly to the vehicle, and
the tongue extending parallel to the anchor lock.

2. The jerry can assembly of claim 1, wherein:
the container body has a first end portion and a second end portion; and
the opening of the container body is disposed at the first end portion.

3. The jerry can assembly of claim 2, wherein the opening of the container body is disposed closer to the tongue than to the anchor.

4. The jerry can assembly of claim 1, wherein the base is removably connected to the jerry can.

5. The jerry can assembly of claim 1, wherein the frame is connected to a bottom surface of the container body.

6. The jerry can assembly of claim 1, wherein:
the tongue and the anchor are opposite one another in a first direction; and
a dimension of the frame measured in a second direction perpendicular to the first direction is greater at a central portion of the frame between the tongue and the anchor than at the tongue and the anchor.

7. The jerry can assembly of claim 1, wherein the anchor further comprises a lever operatively connected to the anchor lock for moving the anchor lock between a locked position and an unlocked position.

8. The jerry can assembly of claim 1, wherein the anchor base is configured to be received in an anchor aperture defined in the anchor fixture.

9. A jerry can assembly configured to be selectively secured to a vehicle, the jerry can assembly comprising:
a jerry can comprising:
a container body for containing fuel therein, the container body defining an opening for filling and emptying the container body; and
a handle connected to the container body for carrying the jerry can;
and
a base connected to the jerry can, the base comprising:
a frame connected to the container body of the jerry can, the frame having a first end and a second end;
a tongue disposed at the first end of the frame; and
an anchor disposed at the second end of the frame, the anchor being configured to secure the jerry can assembly to the vehicle,
the tongue and the anchor being opposite one another in a first direction; and
a dimension of the container body measured in a second direction perpendicular to the first direction is greater than a dimension of the frame measured in the second direction.

10. The jerry can assembly of claim 9, wherein a dimension of the container body measured in the first direction is greater than a dimension of the frame measured in the first direction.

11. The jerry can assembly of claim 9, wherein the base is removably connected to the jerry can.

12. The jerry can assembly of claim 9, wherein the anchor comprises:
an anchor lock adapted to secure the jerry can assembly to the vehicle; and
a lever operatively connected to the anchor lock for moving the anchor lock between a locked position and an unlocked position.

13. The jerry can assembly of claim 9, wherein the anchor comprises an anchor base configured to be received in an anchor aperture.

14. A jerry can assembly configured to be selectively secured to a vehicle, the jerry can assembly comprising:
a jerry can comprising:
a container body for containing fuel therein, the container body defining an opening for filling and emptying the container body; and
a handle connected to the container body for carrying the jerry can;
and
a base connected to the jerry can, the base comprising:
a frame connected to the container body of the jerry can, the frame having a first end and a second end;
a tongue disposed at the first end of the frame; and
an anchor disposed at the second end of the frame, the anchor being configured to secure the jerry can assembly to the vehicle,
the vehicle comprising a first anchor fixture and a second anchor fixture;
the tongue being configured to be inserted into the first anchor fixture; and
the anchor being configured to be inserted into the second anchor fixture, the anchor being configured to be selectively retained by the second anchor fixture to secure the jerry can assembly to the vehicle.

15. The jerry can assembly of claim 14, wherein the base is removably connected to the jerry can.

16. The jerry can assembly of claim 14, wherein the anchor comprises:
an anchor lock adapted to selectively engage the second anchor fixture to secure the jerry can assembly to the vehicle; and
a lever operatively connected to the anchor lock for moving the anchor lock between a locked position and an unlocked position.

17. The jerry can assembly of claim 14, wherein the anchor comprises an anchor base configured to be received in an anchor aperture defined in the second anchor fixture.

18. A bag assembly configured to be selectively secured to a vehicle, the bag assembly comprising:
   a bag having a bag body; and
   a base connected to the bag, the base comprising:
      a frame connected to the bag body, the frame having a first end and a second end;
      a tongue disposed at the first end of the frame; and
      an anchor disposed at the second end of the frame, the anchor being configured to secure the bag assembly to the vehicle,
   the anchor comprising an anchor base and an anchor lock extending downward from the anchor base, the anchor lock being adapted to selectively engage an anchor fixture of the vehicle to secure the bag assembly to the vehicle; and
   the tongue extending parallel to the anchor lock.

19. The bag assembly of claim 18, wherein the base is removably connected to the bag.

20. The bag assembly of claim 18, wherein:
   the tongue and the anchor are opposite one another in a first direction; and
   a dimension of the frame measured in a second direction perpendicular to the first direction is greater at a central portion of the frame between the tongue and the anchor than at the tongue and the anchor.

21. The bag assembly of claim 18, wherein the frame is connected to a bottom surface of the bag body.

22. The bag assembly of claim 18, wherein the anchor further comprises a lever operatively connected to the anchor lock for moving the anchor lock between a locked position and an unlocked position.

23. The bag assembly of claim 18, wherein the anchor base is configured to be received in an anchor aperture defined in the anchor fixture.

24. A bag assembly configured to be selectively secured to a vehicle, the bag assembly comprising:
   a bag having a bag body; and
   a base connected to the bag, the base comprising:
      a frame connected to the bag body, the frame having a first end and a second end;
      a tongue disposed at the first end of the frame; and
      an anchor disposed at the second end of the frame, the anchor being configured to secure the bag assembly to the vehicle,
   the vehicle comprising a first anchor fixture and a second anchor fixture;
   the tongue being configured to be inserted into the first anchor fixture; and
   the anchor being configured to be inserted into the second anchor fixture, the anchor being configured to be selectively retained by the second anchor fixture to secure the bag assembly to the vehicle.

25. The bag assembly of claim 24, wherein the base is removably connected to the bag.

26. The bag assembly of claim 24, wherein:
   the tongue and the anchor are opposite one another in a first direction; and
   a dimension of the frame measured in a second direction perpendicular to the first direction is greater at a central portion of the frame between the tongue and the anchor than at the tongue and the anchor.

27. The bag assembly of claim 24, wherein the anchor comprises:
   an anchor lock adapted to selectively engage the second anchor fixture to secure the jerry can assembly to the vehicle; and
   a lever operatively connected to the anchor lock for moving the anchor lock between a locked position and an unlocked position.

28. The bag assembly of claim 24, wherein the anchor comprises an anchor base configured to be received in an anchor aperture defined in the second anchor fixture.

* * * * *